(12) United States Patent
Huang

(10) Patent No.: US 7,097,014 B2
(45) Date of Patent: Aug. 29, 2006

(54) SHOCK ABSORBER

(76) Inventor: Tan-Cheng Huang, 6FL., No.2-1, Swei St., Taichung (TW)

( * ) Notice: Subject to any disclaimer, the term of this patent is extended or adjusted under 35 U.S.C. 154(b) by 80 days.

(21) Appl. No.: 10/860,962

(22) Filed: Jun. 4, 2004

(65) Prior Publication Data
US 2005/0269178 A1   Dec. 8, 2005

(51) Int. Cl.
*F16F 9/32* (2006.01)
(52) U.S. Cl. .................. 188/300; 267/205; 267/209
(58) Field of Classification Search ............. 188/271, 188/299.1, 283, 284, 286, 287, 300; 267/205, 267/206, 208, 209, 214, 215, 216, 196; 280/276, 280/284
See application file for complete search history.

(56) References Cited

U.S. PATENT DOCUMENTS 3,182,565 A * 5/1965 Millard ................. 188/300
3,469,871 A * 9/1969 Betts ..................... 403/325
3,902,379 A * 9/1975 Bennett et al. ........ 74/480 R
4,679,811 A * 7/1987 Shuler .................. 280/284
5,308,099 A * 5/1994 Browning ............. 280/276
5,509,674 A * 4/1996 Browning ............. 280/276
5,634,537 A * 6/1997 Thorn .................... 188/300

FOREIGN PATENT DOCUMENTS

NL            9985     *  2/1924   ............ 280/276

\* cited by examiner

*Primary Examiner*—Thomas Williams
(74) *Attorney, Agent, or Firm*—Charles E. Baxley

(57) ABSTRACT

A shock absorber, the shock-absorbing function of which can be turned on/off during movement and includes a basement, a clutch assembly, a control assembly and a shock-absorbing spring, the shock-absorbing spring provides damper elastic force for the respective components of the shock absorber. The shock-absorbing function can be turned off when riding up a slope, so as to prevent the drag force being increased by the up and down motion of the shock absorber. The shock-absorbing function can be turned on when riding on a horizontal road, and it can be turned off again when riding down a slope, so as to prevent the increase of the front tilt angle of the bike and leading to turnover.

2 Claims, 49 Drawing Sheets

SHOCK ABSORBER

BACKGROUND OF THE INVENTION

1. Field of the Invention

The present invention relates to a shock absorber, and more particularly to a shock absorber that is used on the bike and the mechanical structure.

2. Description of the Prior Arts

The conventional shock absorber used on the bike usually uses inner spring cooperating with cylinder base and other components to produce a shock-absorbing effect (whether the operation space for the inner spring is filled with hydraulic oil is not the essential condition of the present invention, further discussions on this matter would be omitted). A conventional shock absorber, used on the bike, includes basement, axial shaft and shock-absorbing spring, which are to be explained below. The basement is mounted to the fork of the bike, while the axial shaft is mounted on the frame of the bike. The shock-absorbing spring is biased between the basement and the axial shaft. This kind of shock absorber has been used on different kinds of mechanisms and bikes, yet there are still some defects need to be improved as follows:

First, the conventional shock absorber only has the buffering function, and the buffering function cannot be turned off. Thereby, when riding up a slope, the up-and-down motion of the shock absorber will increase the drag force because the motion of the shock absorber counteracts the pressing force applied by the user.

Second, the conventional shock absorber only has the buffering function, but the buffering function cannot be turned off. When riding down a slope, the up-and-down motion of the shock absorber will change the front tilt angle of the bike, especially when the front shocker is moving downward, the front tilt angle of the bike is much increased. Thereby, there is a danger of falling over.

The present invention has arisen to mitigate and/or obviate the afore-described disadvantages.

SUMMARY OF THE INVENTION

The primary object of the present invention is to provide a shock absorber, the shock-absorbing function of which can be turned on/off during movement. The shock absorber includes a basement, a clutch assembly, a control assembly and a shock-absorbing spring, the shock-absorbing spring provides damper elastic force for the respective components of the shock absorber. The shock-absorbing function can be turned off when riding up a slope, so as to prevent the drag force being increased by the up and down motion of the shock absorber. The shock-absorbing function can be turned on when riding on a horizontal road, and it can be turned off again when riding down a slope, so as to prevent the increase of the front tilt angle of the bike and leading to turnover.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
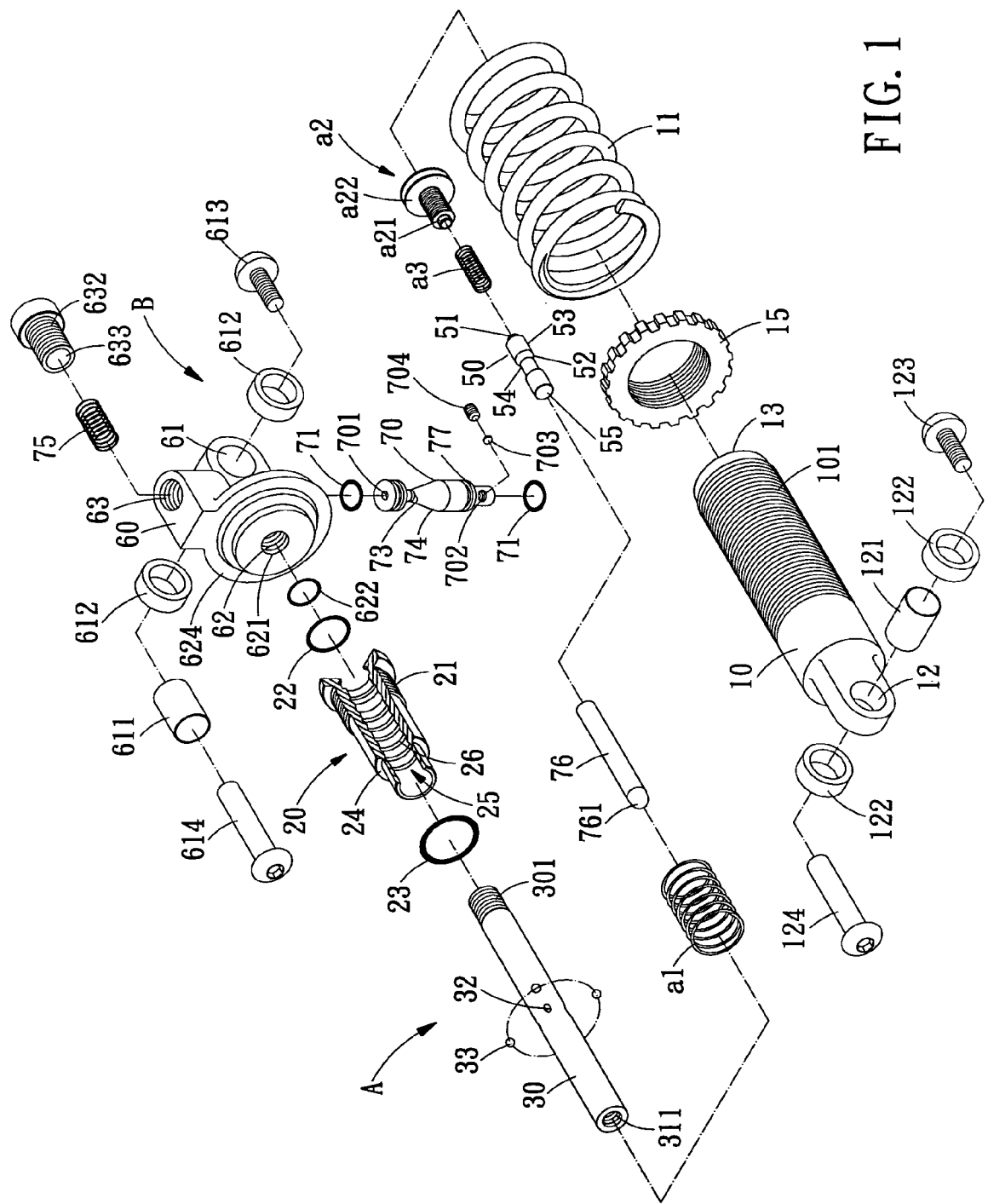
FIG. 1 is an exploded view of a shock absorber in accordance with a first embodiment of the present invention.
Figure 2:
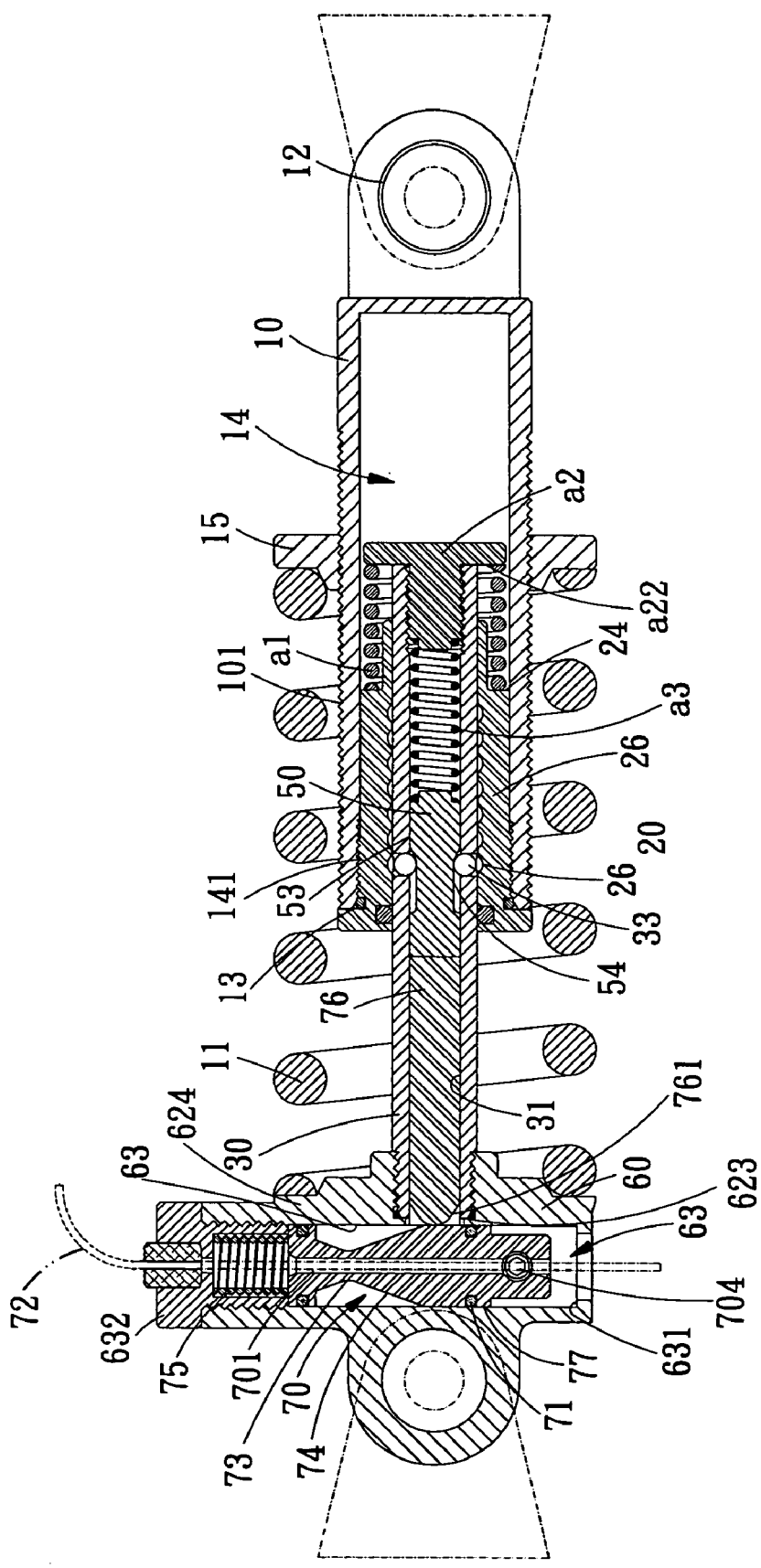
FIG. 2 is a cross sectional view in accordance with a first embodiment of the present invention for showing the shock absorber in a state of being unlocked.
Figure 3:
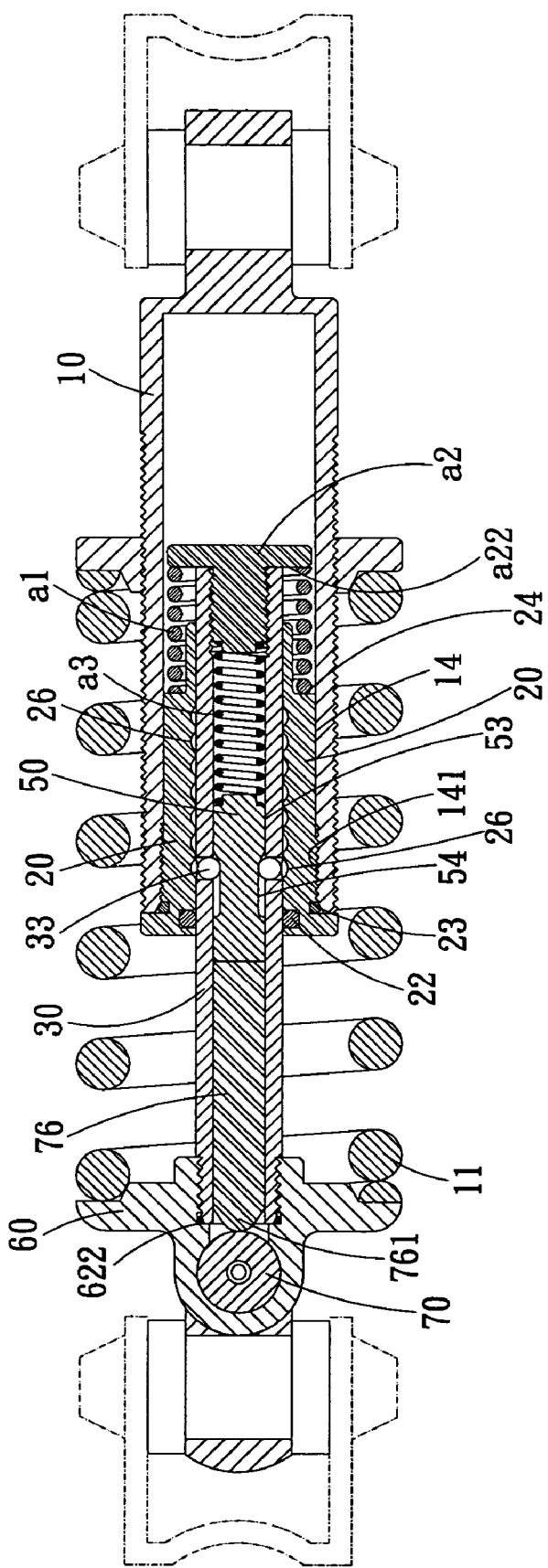
FIG. 3 is another cross sectional view in accordance with a first embodiment of the present invention for showing the shock absorber in a state of being unlocked.

Referring to FIGS. 1–3, a bike shock absorber in accordance with a first preferred embodiment of the present invention is shown and generally including: a basement 10, a clutch assembly A, a control assembly B, a shock-absorbing spring 11 and a buffer spring a1.

The basement 10, a first end of which is formed with a hole 12 that is interiorly provided with a sleeve 121, a jacket 122; a male screw 123 and a female screw 124 are used to position the sleeve 121 and the jacket 122 in the hole 12 of the basement 10. A second end of the basement 10 is opened with a mouth 13 that is in communication with a space 14 inside the basement 10. Plural inner threads 141 are formed in the space 14 and located adjacent to the mouth 13, while on the outer periphery of the basement 10 is defined with plural outer threads 101 that are to be screwed with an adjusting ring 15.

The clutch assembly A includes a positioning member 20, an axial tube 30, a clutch member 33 and a control element 50, wherein:

The positioning member 20 is provided at a first end thereof with plural outer threads 21 serving to mesh with the inner threads 141 in the space 14 of the basement 10. The positioning member 20 is further provided at a position adjacent to the mouth 13 of the basement 10 with an inner ring 22 and an outer ring 23. A second end of the positioning member 20 is formed with step periphery 24. A through hole 25 is defined in the positioning member 20, in the through hole 25 is further formed with plural positioning grooves 26.

The axial tube 30 is interiorly formed with a through hole 31 and serves to be inserted in the through hole 25 of the positioning member 20. An end of the through hole 25 corresponding the basement 10 is provided with plural inner threads 311, while another end of the axial tube 30 opposite to the inner threads 311 is provided with plural outer threads 301. Furthermore, at a position of the axial tube 30 corresponding to the positioning grooves 26 of the positioning member 20 is formed a positioning hole 32.

The clutch member 33 is received in the positioning hole 32 of the axial tube 30 and corresponds to the positioning grooves 26 of the positioning member 20.

The control element 50 is slidably disposed in the through hole 31 of the axial tube 30. On an end surface of the control element 50 is provided a protrusive periphery 51, and on the outer periphery of the control element 50 is formed with annular step portion 52 that divides the control element 50 into a big diameter portion 53 and a small diameter portion 54. The front periphery of the small diameter portion 54 of the annular step portion 52 is formed with an end surface 55.

The control assembly B includes a base body 60, a control shaft 70, a back-moving spring 75, an abutting member 76, a cover a2 and a control spring a3. The detail structure is explained as follows:

The base body 60 is formed at a first end with a hole 61 and in which is respectively disposed a sleeve 611 and a jacket 612. A male screw 613 and a female screw 614 are used to position the sleeve 611 and the jacket 612 in the hole 61 of the basement 60. A receiving hole 62 is formed at a second end of the base body 60 and interiorly provided with inner threads 621 for meshing with the outer threads 301 of the axial tube 30. A flange 623 is formed at the bottom of the receiving hole 62 for fixing an end of the axial tube 30. A flange 624 is formed outside the receiving hole 62 of the base body 60. The base body 60 is further formed with a control hole 63 that is perpendicular to the receiving hole 62. The control hole 63 is in communication with the end of the receiving hole 62. A flange 631 is formed at an end of the receiving hole 62, and a positioning cover 632 is screwed to another end of the receiving hole 62. An end of the positioning cover 632 is formed with a through hole 633.

The control shaft 70 is slidebly received in the control hole 63 of the base body 60 via two seal rings 71. An end of the control shaft 70 is formed with step periphery 77 that is confined by the flange 631 in the control hole 63 of the base body 60. The control shaft 70 is interiorly formed with an axial hole 701 for insertion of a steel cord 72 that passes outward through the through hole 633 of the positioning cover 632 (the steel cord 72 is controlled by user). Another end of the control shaft 70 is formed with a threaded hole 702, via a washer 703 and a screw 704, the steel cord 72 is fixed in the axial hole 701 of the control shaft 70. On an outer periphery of the control shaft 70 is annularly formed with a groove 73 and an annular cone-shaped surface 74.

The back-moving spring 75 is disposed in the through hole 633 of the positioning cover 632 of the base body 60, an end of which abuts against the positioning cover 632 and another end of the back-moving spring 75 abuts against the control shaft 70.

The abutting member 76 is slidably disposed in through hole 31 of the axial tube 30. An end of the abutting member 76 is provided with an arc surface 761 that is inserted through the end of the axial tube 30 having the outer threads 301 and abuts against the groove 73 and the annular cone-shaped surface 74 of the control shaft 70, while another end of the abutting member 76 is used to abut against the end surface 55 of the small diameter portion 54 of the annular step portion 52.

The cover a2 is meshed with the inner threads 311 in the axial tube 30 of the clutch assembly A, an end of which is formed with a boss portion a21. And the cover a2 is further provided with annular periphery a22.

The control spring a3 is received in the through hole 31 of the axial tube 30 of the clutch assembly A, an end which abuts against the protrusive periphery 51 of the control element 50 of the clutch assembly A, while another end of the control spring a3 abuts against the boss portion a21 of the cover a2.

The shock-absorbing spring 11 is biased between the adjusting ring 15 of the basement 10 and the flange 624 of the base body 60 of the control assembly B.

The buffer spring a1 is exteriorly mounted on the axial tube 30, an end of which abuts against the annular periphery a22 of the cover a2 at the end of the axial tube 30 of the clutch assembly A, while another end of the buffer spring a1 abuts against the step periphery 24 of the positioning member 20.

Referring particularly to FIGS. 2 and 3, when the user wants the shock absorbing function of the shock absorber, he can pull a length of the steel cord 72 out and then fix it in the axial hole 701 of the control shaft 70 (the method of pulling and fixing the steel cord 72 belongs to conventional technology, so it would not be mentioned here), so as to make the end of the control shaft 70 compress the back-moving spring 75. At this moment, the outer periphery of the control shaft 70 will abut against the arc surface 761 of the abutting member 76. Thereby, a movement of the control shaft 70 makes the arc surface 761 of the abutting member 76 raise from the groove 73 of the control shaft 70 to the big diameter portion of the annular cone-shaped surface 74, so that the abutting member 76 will move the control element 50 and compress the control spring a3. The movement of the control element 50 makes the 4big diameter portion 53 of the annular cone-shaped portion 52 of the control element 50 disengage from the clutch member 33 of the axial tube 30, and makes the clutch member 33 slide smoothly from the big diameter portion 53 of the annular cone-shaped portion 52 of the control element 50 into the small diameter portion 54 of the control element 50, so as to allow the axial tube 30 to move relatively to the positioning member 20. The shock of the bike can be absorbed by the shock-absorbing spring 11, while the buffer spring a1 biased between the step periphery 24 of the positioning member 20 and the annular periphery a22 of the cover a2 is employed to work as an end buffer. Thereby, the shock absorber in accordance with the present invention can be used on the bike or the mechanical structure.

Figure 4:
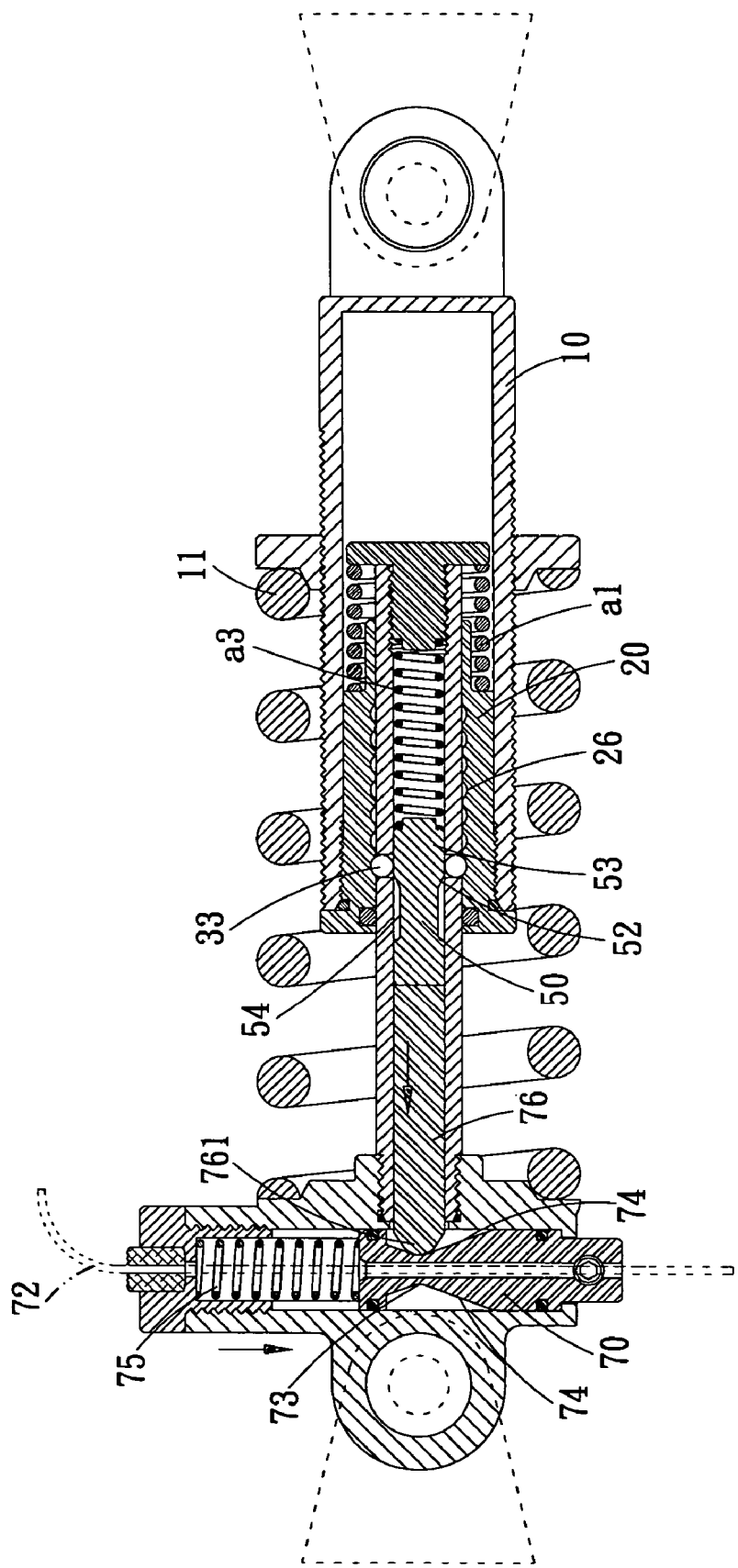
FIG. 4 is a cross sectional view in accordance with a first embodiment of the present invention for showing the shock absorber in a state of being locked.
Figure 5:
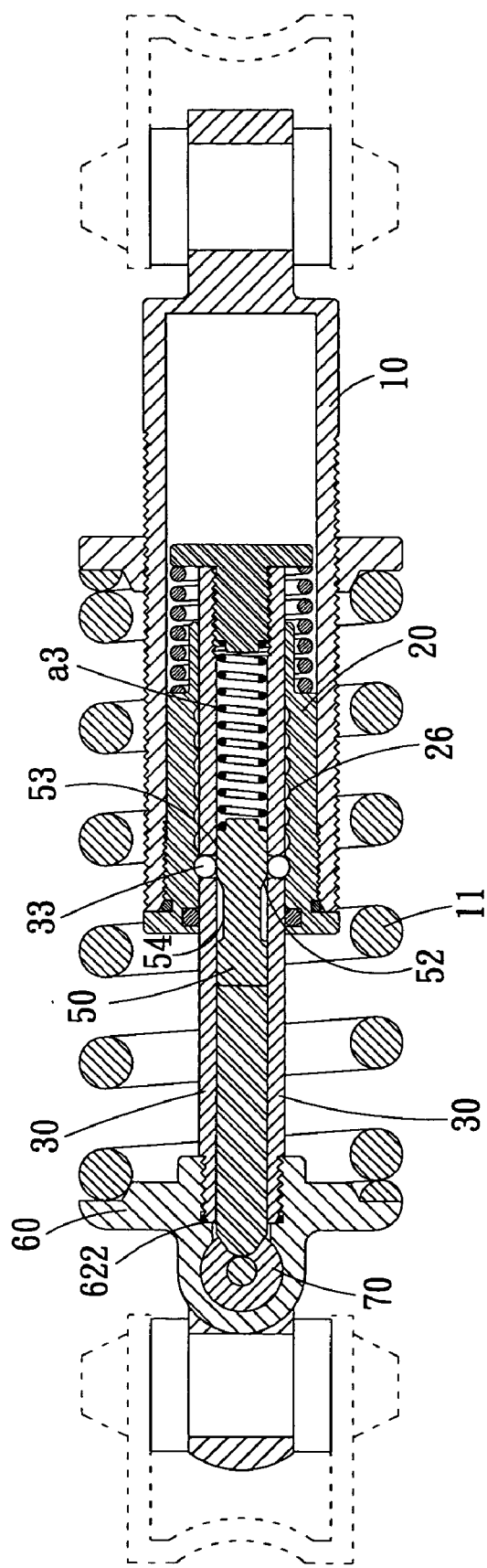
FIG. 5 is another cross sectional view in accordance with a first embodiment of the present invention for showing the shock absorber in a state of being locked.
Figure 6:
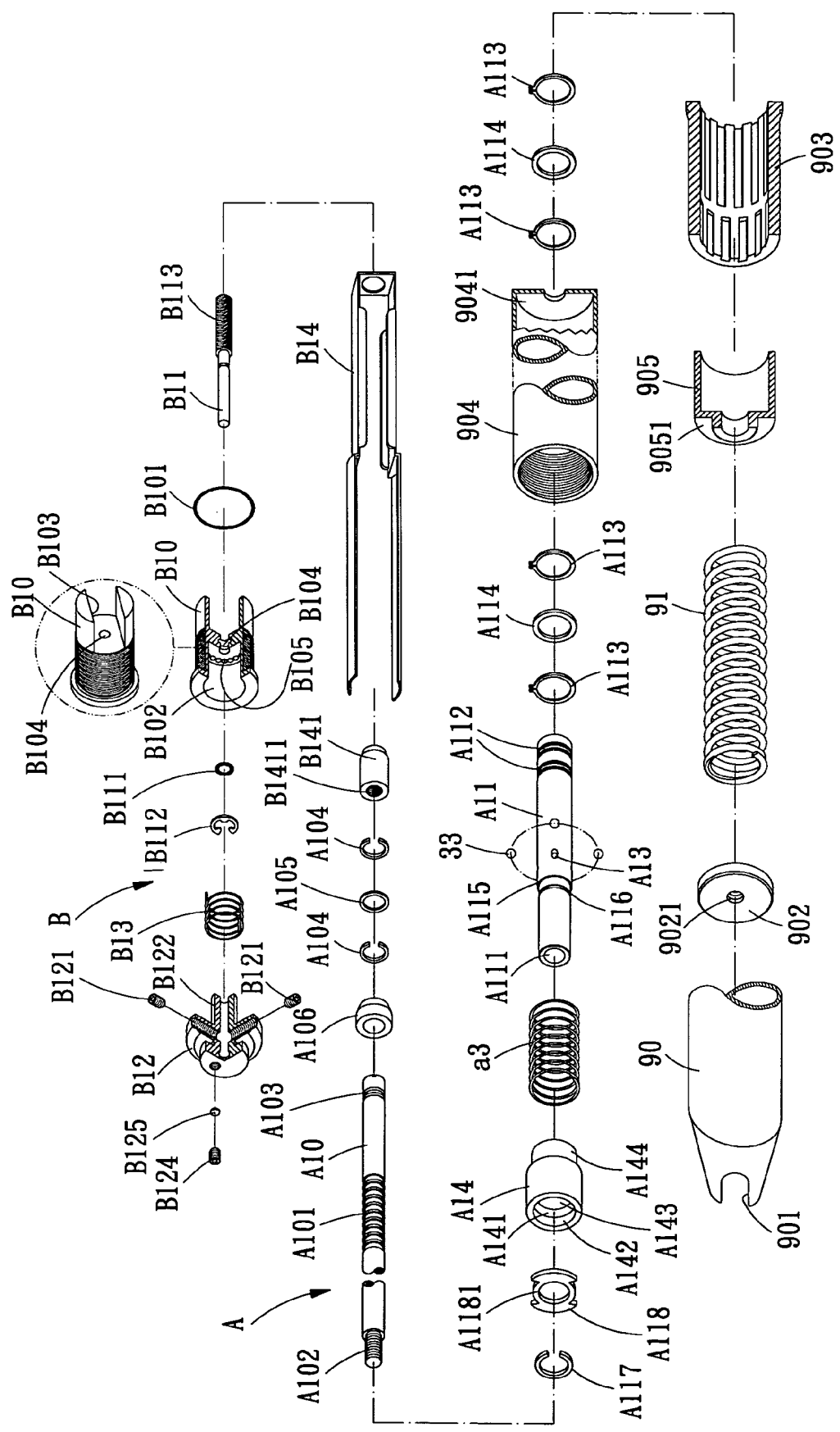
FIG. 6 is an exploded view of a shock absorber in accordance with a second embodiment of the present invention.
Figure 7:
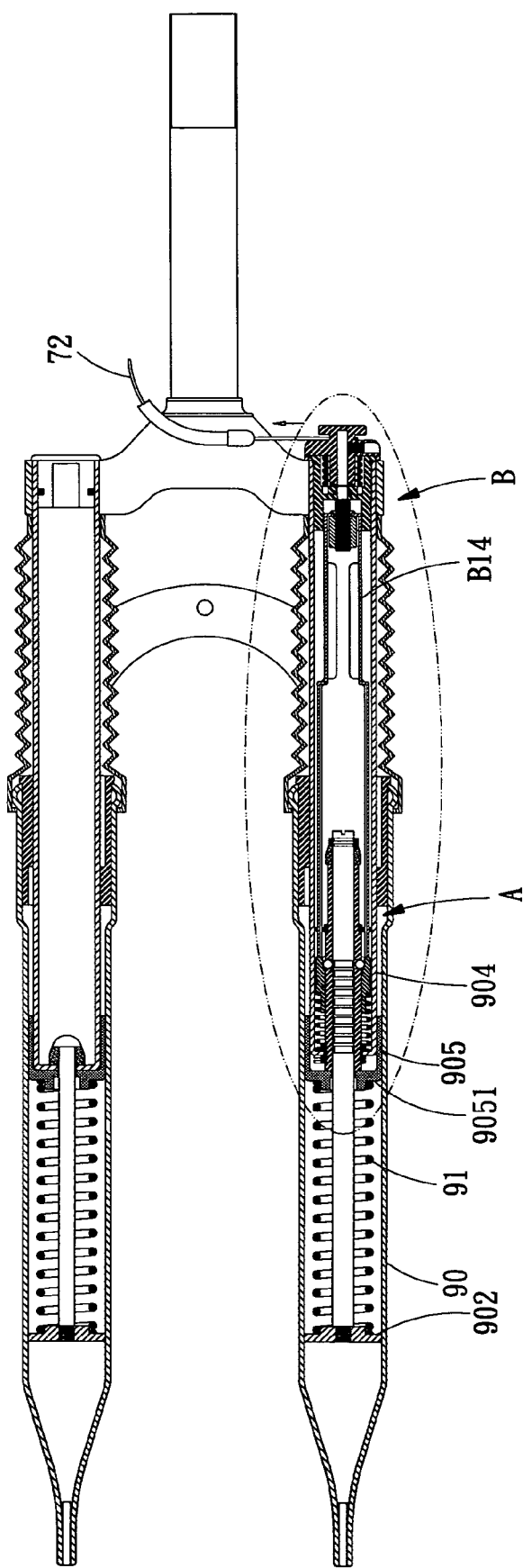
FIG. 7 is a cross sectional view of the shock absorber in accordance with a second embodiment of the present invention.

Referring to FIGS. 4 and 5, when riding up a slope and the shock-absorbing function of the shock absorber (in order avoid an increase in drag force caused by the up-and-down motion of the shock-absorber) needs to be turned off, the user can push and release a length of the steel cord 72. The control shaft 70 and the steel cord 72 will be pushed back to their original position by the back-moving spring 75. At the moment, the movement of the control shaft 70 makes the arc surface 761 of the abutting member 76 move along the annular cone-shaped surface 74 of the control shaft 70 and slide into the groove 73. Such that the abutting member 76 moves a distance away from the control element 50, and the compressing force of the control spring a3 pushes the control element 50 to move. The big diameter portion 53 of the annular step portion 52 of the control element 50 pushes the clutch member 33 to move into one of the plural positioning grooves 26 of the positioning member 20. At this moment, the shock absorber still will move up and down if the positioning groove 26 of the positioning member 20 is not meshed with the clutch member 33. During an instant period of the motion of the shock absorber, when the clutch member 33 is in alignment with one of the positioning grooves 26, the control spring a3 will instantly move the control element 50, and the big diameter portion 53 of the annular step portion 52 of the control element 50 pushes the clutch member 33 to move into the positioning groove 26 of the positioning member 20. At this moment, the positioning member 20 is locked with the axial tube 30, and thus the shock absorber is locked since the basement 10 and the control assembly B are unable to move relative to each other. Moreover, since the positioning member 20 is provided with plural positioning grooves 26, in real operation, the clutch member 33 can be pushed by the control spring a3 and engages into one of the positioning grooves 26 of the positioning member 20. That is to say that, the user is able to turn on and off the shock absorbing function of the shock absorber according to needs.

Referring to FIGS. 6–9, a bike shock absorber (which is mounted on the front fork of a bike) in accordance with a second preferred embodiment of the present invention is shown and generally including: a basement 90, a clutch assembly A, a control assembly B, a shock-absorbing spring 91.

The basement 90, a gap 901 formed at a lower end of which is used to coupled to the front wheel axle of a bike. To a bottom of an inner space of the basement 90 is fixed a base board 902 that is formed at the center thereof with a threaded hole 9021. A mid sleeve 903 is disposed adjacent to the top end of the inner space of the basement 90 and interiorly equipped with a receiving tube 904. An upper end of the receiving tube 904 is fixed to the front fork of the bike, while a lower end of the receiving tube 904 is provided with a slide bush 905. Through the cooperation between the mid sleeve 903 and the slide bush 90, the receiving tube 904 is allowed to freely slide in the basement 90. The receiving tube 904 is provided at an end thereof corresponding to the baseboard 902 with a bottom 9041.

The clutch assembly A includes a positioning member A10, an axial tube A11, a clutch member 33 and a control element A14. A first end of the positioning member A10 is provided with threads A102 and screwed in the threaded hole 9021 of the baseboard 902 of the basement 90, and a second end of the positioning member A10 is formed with locking groove A103. Via several positioning retainers A104, washers A105 and a buffer cushion A106, the positioning member A10 is used to position the receiving tube 904 in the basement 90. In addition, the positioning member A10 is provided at the outer periphery thereof with plural positioning grooves A101.

The axial tube A11 is interiorly formed with a through hole A111 for slidably receiving the positioning member A10. Plural positioning holes A13 are formed on the periphery of the axial tube A11. The positioning holes A13 correspond to the positioning grooves A101 of the positioning member A1. A first end of the axial tube A11 is formed with plural retaining grooves A112 that are to be fixed to the bottom 9041 of the receiving tube 904 of basement 90 via plural retaining rings A11 and washers A114. A second end of the axial tube A11 corresponding to buffer cushion A106 is formed with a step periphery A115 and a retaining groove A116 respectively. The retaining groove A116, via a retaining ring A117, serves to fix a limit piece A118 beside the step periphery A115. The outer periphery of the limit piece A118 is provided with gaps A1181.

The clutch member 33 is slidably received in the positioning hole A13 of the axial tube A11.

The control element A14 is slidably mounted on the exterior periphery of the axial tube A11 and interiorly provided with an annular cone-shaped step portion A141. The annular cone-shaped step portion A141 divides the inner space of the control member A14 into a big diameter portion A142 and a small diameter portion A143. The annular cone-shaped step portion A141 corresponds to the positioning holes A13 of the axial tube A11. At a position of the outer periphery of the control element A14 corresponding to the bottom 9041 of the receiving tube 904 is provided with a step periphery A144.

The control assembly B includes a base body B10, a control shaft B11, a rotary knob B12, a back-moving spring B13, an abutting member B14 and a control spring a3.

The base body B10 is screwed on an upper end of the receiving tube 904 of the basement 90 via a seal ring B101. A first end of the base body B10 is formed with an inner hole B102, while a second end the base body B10 is formed with a slot B103, and a through hole B104 is located between the inner hole B102 and the slot B103. Furthermore, plural holes B105 are formed adjacent to the through hole B104 for insertion of the spring.

A first end of the control shaft B11 is inserted in the through hole B104 of the base body B10 via a seal ring B111, and the control shaft B11 is retained in the base body B10 by a retaining member B112. A second end of the control shaft B11 is provided with driving threads B113.

The rotary knob B12 is able to rotate after being pulled by the steel cord 72 (the steel cord is controlled by user) and fixed to the control shaft B11 via positioning screws B121. A hole B123 is formed on bottom of the outer periphery B122 at a first end of the rotary knob B12 for insertion of spring. A second end of the rotary knob B12 is used to fix the steel cord 72 via screws B124 and positioning cushions B125. The rotary knob B12 is rotatable on the base body B10. The back-moving spring B13 serves to produce a rotating elastic force in a predetermined direction and to be mounted on the outer periphery B122 of the rotary knob B12. A first end of the back-moving spring B13 is inserted in the holes B105 of the base body B10 (can be inserted in any hole B105 according to the needs of the user so as to get different elastic force). A second end of the back-moving spring B13 is inserted in the hole B123 of the rotary knob B12.

The abutting member B14, a first end of which is fixed with an axial bush B141, the axial bush B141 is interiorly formed with driving threads B1411 that are meshed with the driving threads B113 at the end of the control shaft for purpose of motion-transmitting. In this case, the first end of the abutting member B14 can be interactively connected to the control shaft B11 via the axial bush B14 (the abutting member B14 can transmit motion to the control shaft B11, and vice versa). The second end of the abutting member B14 is inserted in the gaps A1181 of the limit piece A118 at the end of the axial tube A11 and abuts against the end surface of the control element A14 of the clutch assembly A.

The control spring a3 is mounted on the outer periphery of the axial tube A11 of the clutch assembly A and biased between the step periphery A144 of the control member A14 and the bottom 9041 of the receiving tube 904 of the basement 90.

The shock-absorbing spring 91 is biased between the baseboard 902 of the basement 90 and the step periphery 9051 of the slide bush 905 at the lower end of the receiving tube 904.

Figure 8:
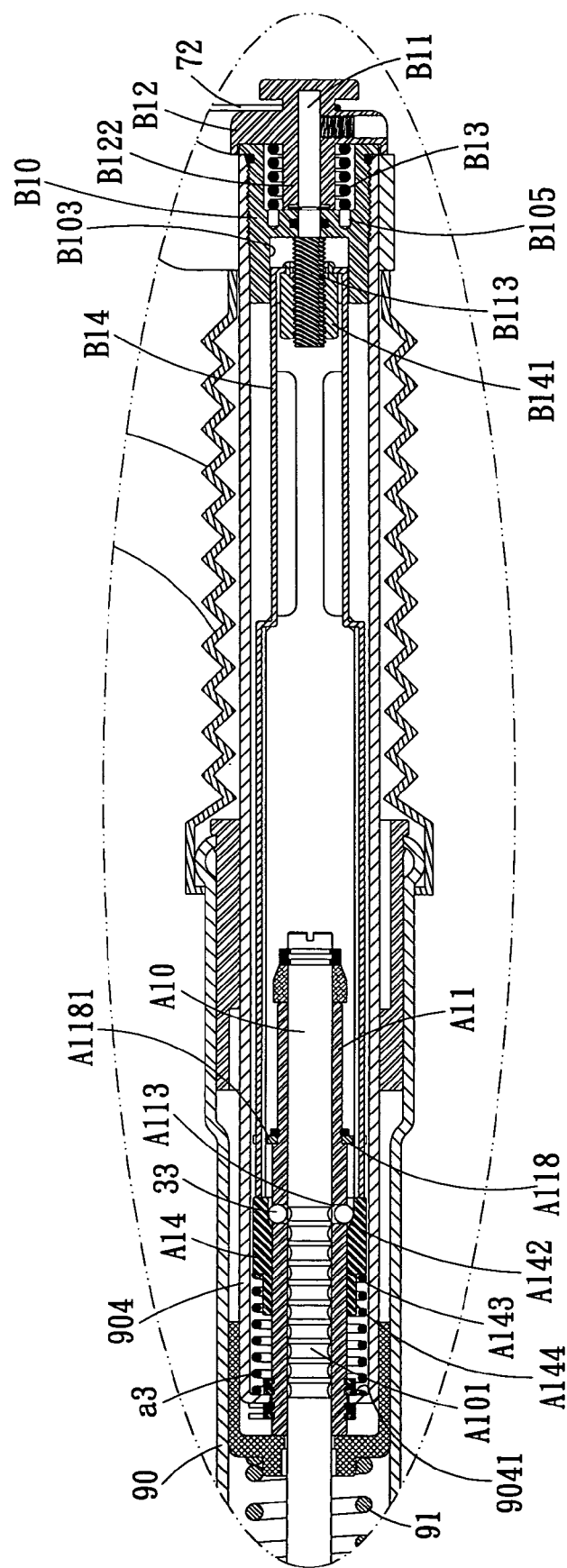
FIG. 8 is a cross sectional view in accordance with a second embodiment of the present invention for showing the shock absorber in a state of being unlocked.
Figure 9:
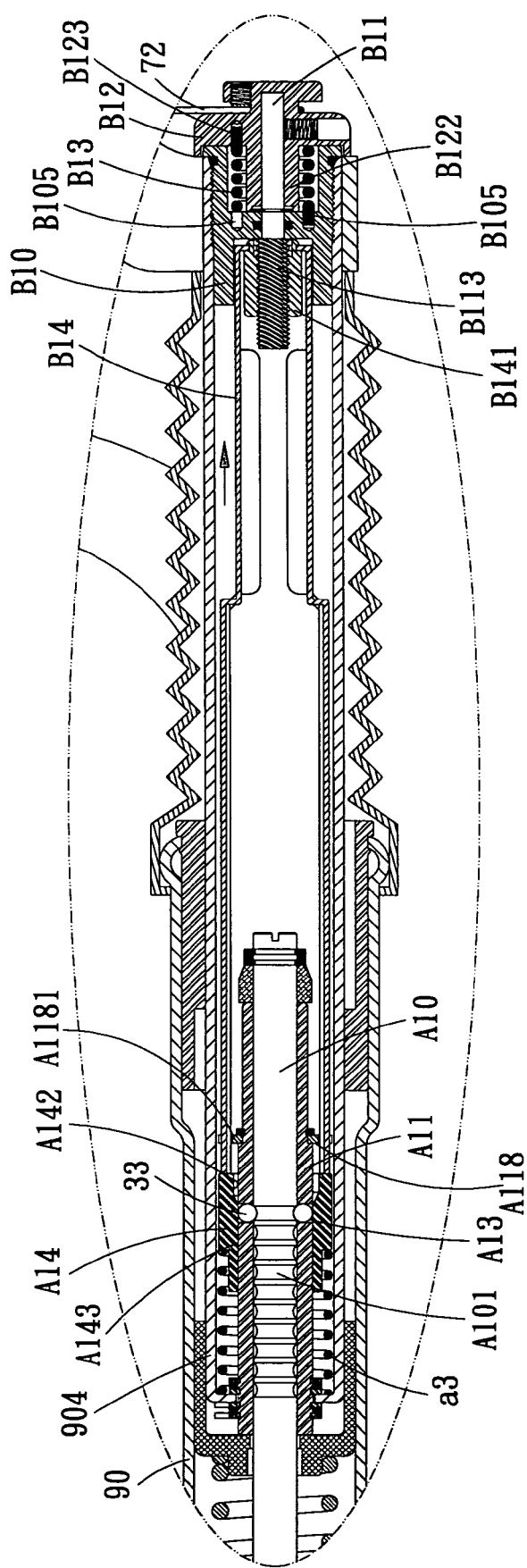
FIG. 9 is a cross sectional view in accordance with a second embodiment of the present invention for showing the shock absorber in a state of being locked.
Figure 10:
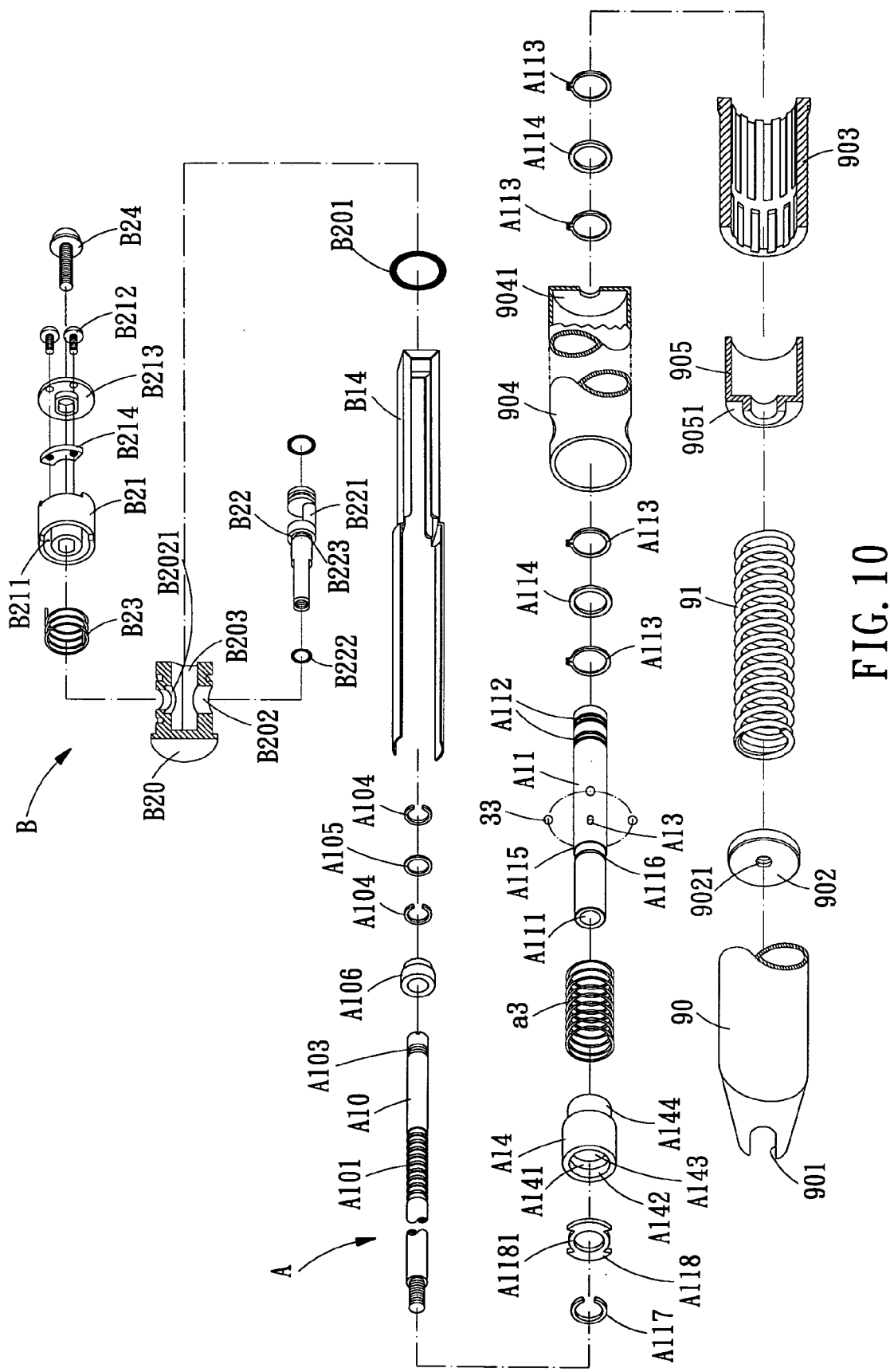
FIG. 10 is an exploded view of the shock absorber in accordance with a third embodiment of the present invention.

Referring particularly to FIGS. 8 and 9, which show the operation manner and the function of the shock absorber in accordance with the second preferred embodiment of the present invention.

As shown in FIG. 8, when the user wants to disable the shock absorbing function of the shock absorber, the he can pull a length of steel cord 72 and fix it (the method of pulling and fixing the steel cord 72 belongs to conventional technology) so as to cause a rotation of the rotary knob B12, synchronously to drive the control shaft B11 to rotate and further to compress the back-moving spring B13. During rotation, the driving threads B113 at the end of the control shaft B11 will move the abutting member B14 (since the driving threads B1411 of the axial bush B141 at the first end of the abutting member 14 is interactively connected to the driving threads B13 at the end of the control shaft, and the abutting member B14 is unrotatable due to its outer periphery is confined by the slot B103 at the end of the base body B10, furthermore, the second end of the abutting member B14 abuts against the end surface of the control element A14 after passing through the gap A1181 of the limit piece A118). At this moment, the abutting member B14 moves the control element A14 and synchronously compresses the control spring a3, so as to enable the clutch member 33 to slide from the small diameter portion A143 of the annular cone-shaped step portion A141 of the control element A14 into the big diameter portion A142. Thus, the clutch member 33 slides out of the positioning grooves A101 of the positioning member A10. As a result, the positioning member A10 and the axial tube A11 can move relative to each other. At this moment, the basement 90, the receiving tube 904 and the shock-absorbing spring 91 are able to produce a buffering effect.

As shown in FIG. 9, when riding up a slop, and the shock absorbing function of the shock absorber needs to be turned off for safe purpose (to prevent the tilt angle being increased by the motion of the shock absorber and causing the bike fall over), the user can push and release a length of the steel cord 72. The rotary knob B12 and the steel cord 72 are pushed by the back-moving spring B13 and rotate to their original position. The control shaft B11 is driven to rotate in opposite direction. The threads on the control shaft will drive the abutting member B14 to move, so as to form a space between the end of the abutting member B14 and the end surface of the control element A14. Meanwhile, the control spring a3 pushes the control element A14 to move. The small diameter portion A143 of the annular cone-shaped step portion A141 inside the control element A14 will push the clutch member 33 to move from the positioning hole A13 of the axial tube A11 and make it engage in one of the plural positioning grooves A101 of the positioning member A10. At this moment, the positioning member A10 is locked with the axial tube A11, and the basement 90 and the receiving tube 904 are unable to move relative to each other. Thus, the shock absorbing function is turned off.

The shock absorber still will move up and down if the positioning groove A101 of the positioning member A10 is not meshed with the clutch member 33. During an instant period of motion of the shock absorber, when the clutch member 33 is in alignment with one of the positioning grooves A101, the control spring a3 will instantly move the control element A14, and the small diameter portion A143 of the annular cone-shaped step portion A141 of the control element A10 pushes the clutch member 33 to move into the positioning groove A101 of the positioning member A10. Since the positioning member A10 is provided with plural positioning grooves A101, in real operation, the clutch member 33 can be pushed by the control spring a3 and engages into one of the positioning grooves A101 of the positioning member A10. That is to say that the shock absorbing function of the shock absorber can be turned on/off according to needs.

Referring to FIGS. 10–14, a bike shock absorber in accordance with a third preferred embodiment of the present invention is shown and generally including: a basement 90 having a base board 902, a clutch assembly A, a control assembly B, a shock-absorbing spring 91. The control assembly B in this embodiment is differently designed as compared to that of the second embodiment, which uses another technique to operate the steel cord 72 and the control shaft B22. The different structure is to be explained in the following descriptions:

The control assembly B includes a basement B20, a control shaft B22, a rotary knob B21, a back-moving spring B23, an abutting member B14 and a control spring a3.

The basement B20 is disposed at the top end of the receiving tube 904 via a seal ring B201 (the rest unmarked components are identical with that of the second embodiment). The basement B20 is interiorly formed with a square space B203 for reception of the abutting member B14. The abutting member B14 is slidably but non-rotatably disposed in the square space B203, and a control hole B202 perpendicularly passes through the square space B203. The control hole B202 is formed with an inner flange B2021.

The control shaft B22 is moveably inserted in the control hole B202 via two seal rings B222. A first end of the control shaft B22 is provided with an eccentric abutting portion B221, and a step periphery B223 is formed adjacent to the mid of the control shaft B22 and positioned to the inner flange B2021 of the control hole B202 of the basement B20.

The rotary knob B21 is fixed to an end of the control shaft B22 via a screw B24. A cover B213 and a positioning block B214 are fixed to the end surface of the rotary knob B21 via screw B212. The rotary knob B21 uses the positioning block B214 to position an end of the steel cord 72. The steel cord 72 is controlled by the user.

The back-moving spring B23 is a tension spring received in an annular groove B211 of the rotary knob B2, both ends of the back-moving B23 are respectively fixed to the rotary knob B21 and the basement B20 (the back-moving spring B23 serves to produce torsion force in a predetermined direction).

Figure 11:
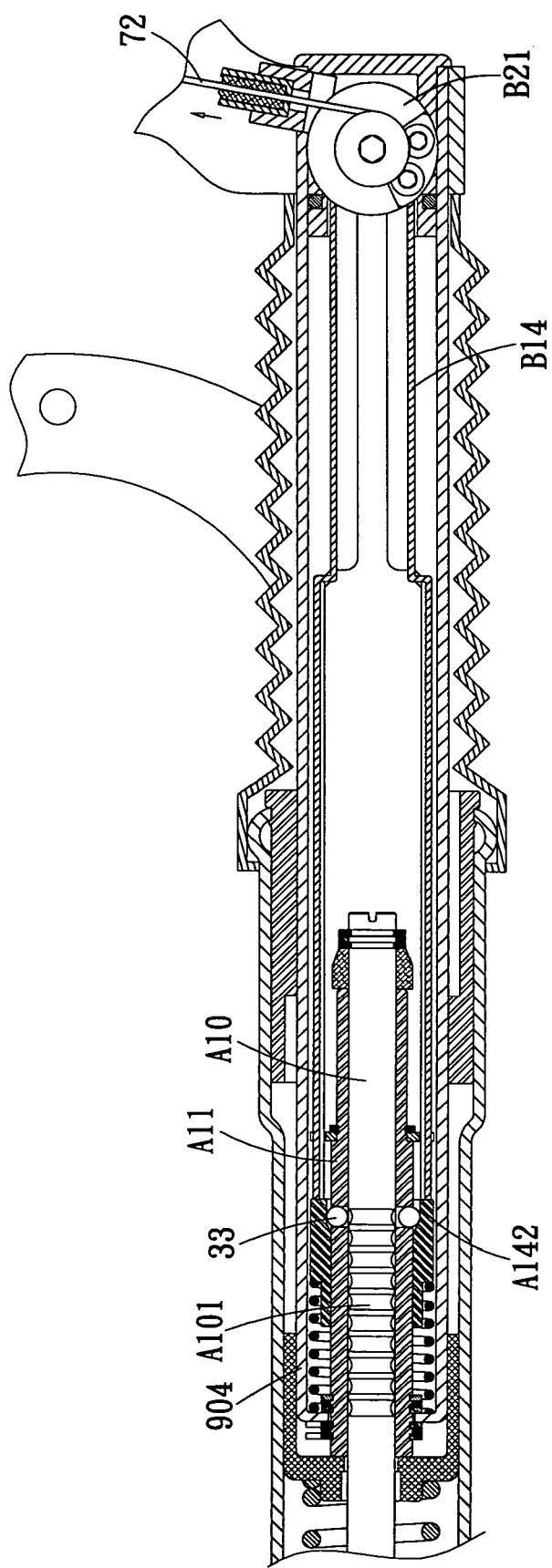
FIG. 11 is a cross sectional view in accordance with a third embodiment of the present invention for showing the shock absorber in a state of being unlocked.
Figure 12:
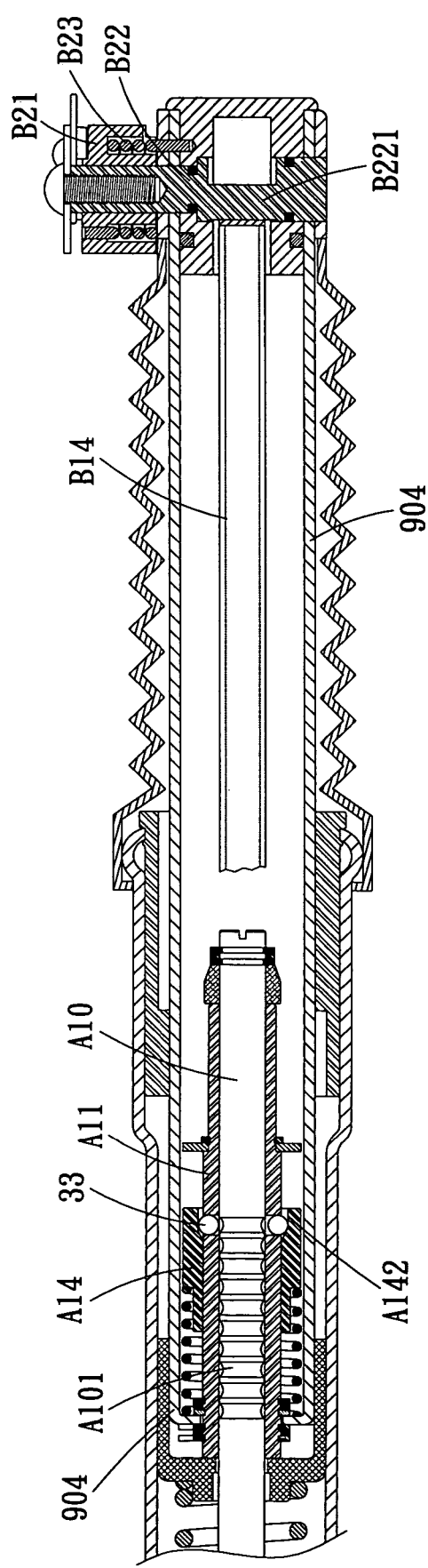
FIG. 12 is another cross sectional view in accordance with a third embodiment of the present invention for showing the shock absorber in a state of being unlocked.

Referring particularly to FIGS. 11 and 12, which show operation manner and function of the shock absorber in accordance with the third preferred embodiment of the present invention (specially aiming at the different structure).

As shown in FIGS. 11 and 12, when the user pulls a length of the steel cord 72 and fixes it (the shock-absorbing function is turned off), the rotary knob B21 will rotate the control shaft B22. Then the eccentric abutting portion B221 of the control shaft B22 moves towards the baseboard 902. At this moment, the front end of the abutting member B14 is abutted by the eccentric abutting portion B221, so it will push the control member A14 to move toward the baseboard 902. As a result, the clutch member 33 moves close to the big diameter portion A142 of the control member A14, while the clutch member 33 slides out of the positioning groove A101 of the positioning member A10. Through this way, the positioning member A10 is able to move relative to the axial tube A11 (the receiving tube 904 is able to freely move downward after being affect by force). Thus, the shock-absorbing function is turned off.

Figure 13:
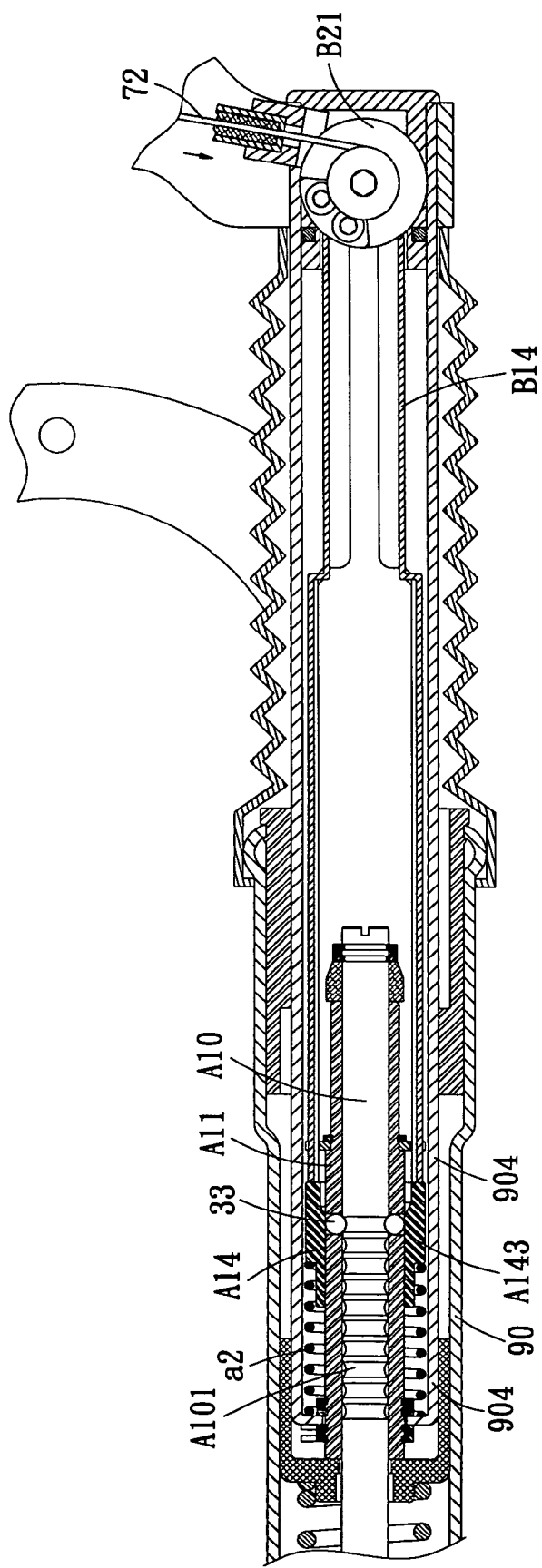
FIG. 13 is a cross sectional view in accordance with a third embodiment of the present invention for showing the shock absorber in a state of being locked.
Figure 14:
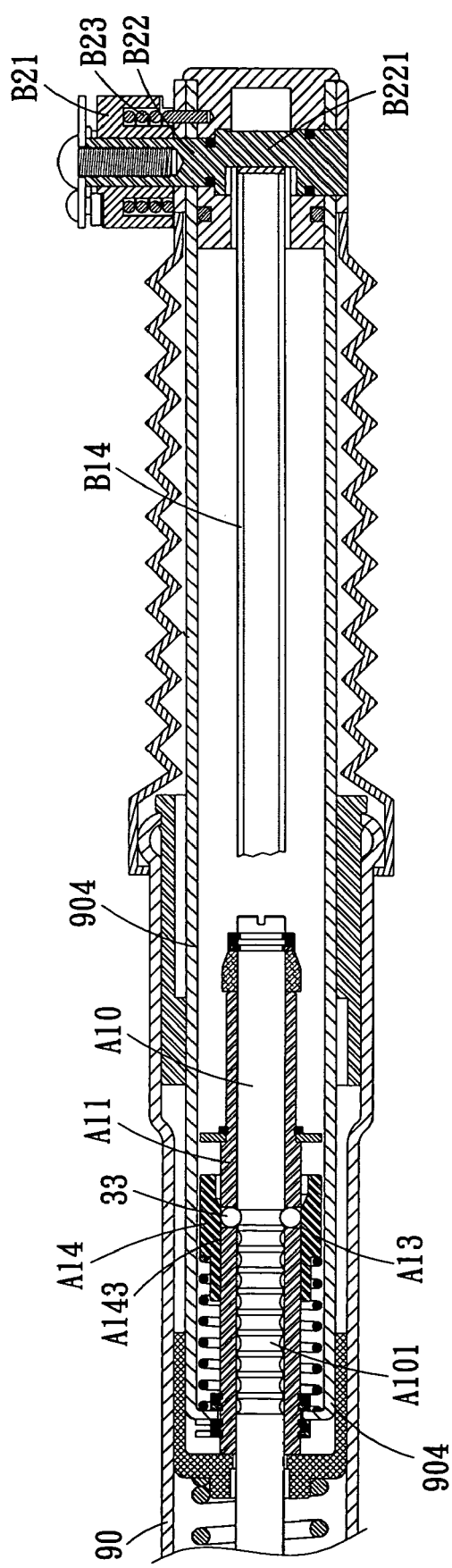
FIG. 14 is another cross sectional view in accordance with a third embodiment of the present invention for showing the shock absorber in a state of being locked.

As shown in FIGS. 13 and 14, when the user pushes and releases a length of the steel cord 72 (the shock-absorbing function is turned off, the back-moving spring B23 rotates and then positions the rotary knob B21. The control shaft B22 is synchronously driven to rotate by the rotary knob B21, such that the eccentric abutting portion B221 rotates in a direction away from the baseboard 902 and disengages from the end of abutting member B14. At this moment, a space is formed between the abutting member B14 and the control member A14 and makes the control spring a3 move the control member A14 with its restoring force. And then the small diameter portion A143 of the annular cone-shaped step portion A141 inside the control member A14 pushes the clutch member 33 to move from the positioning hole A13 of the axial tube A11 and engage in one of the plural positioning grooves A101 of the positioning member A10. At this moment, the positioning member A10 is locked with the axial tube A11. Accordingly the basement 90 is unable to move relative to the receiving tube 904, and the shock-absorbing function is achieved. The above-mentioned application of the third preferred embodiment is achieved only by improving the structure of the control assembly B, the disclosed technical characteristics are identical to that of the second embodiment and may be made without departing from the scope of the present invention.

Figure 15:
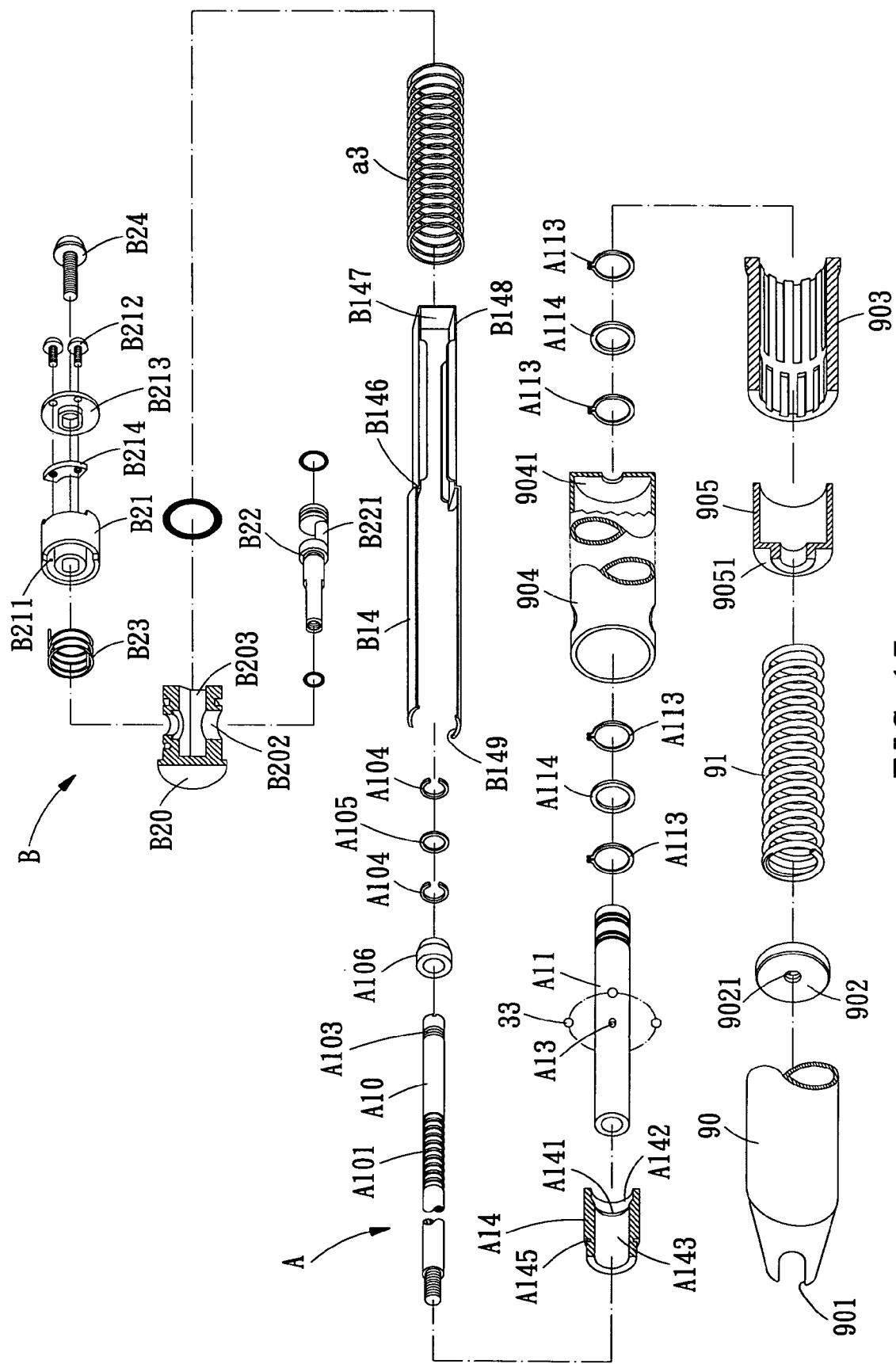
FIG. 15 is a cross sectional view of the shock absorber in accordance with a fourth embodiment of the present invention.
Figure 16:
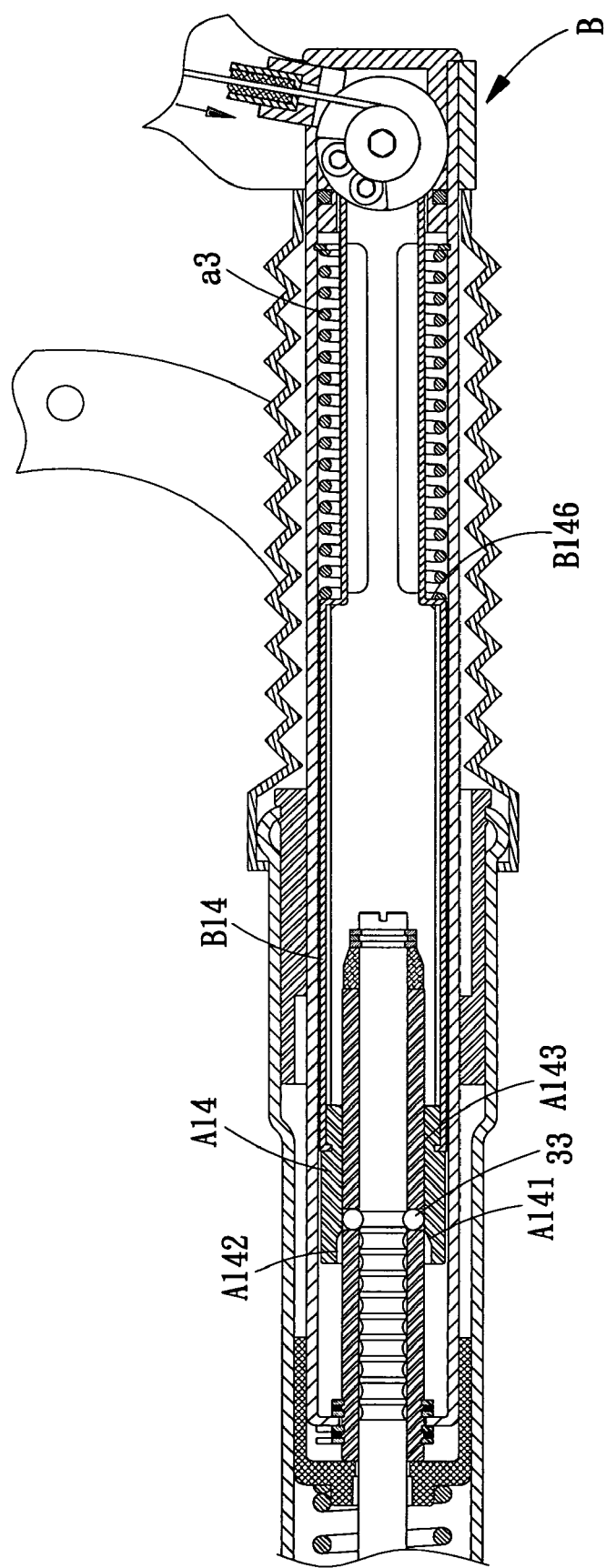
FIG. 16 is a cross sectional view in accordance with a fourth embodiment of the present invention for showing the shock absorber in a state of being locked.
Figure 17:
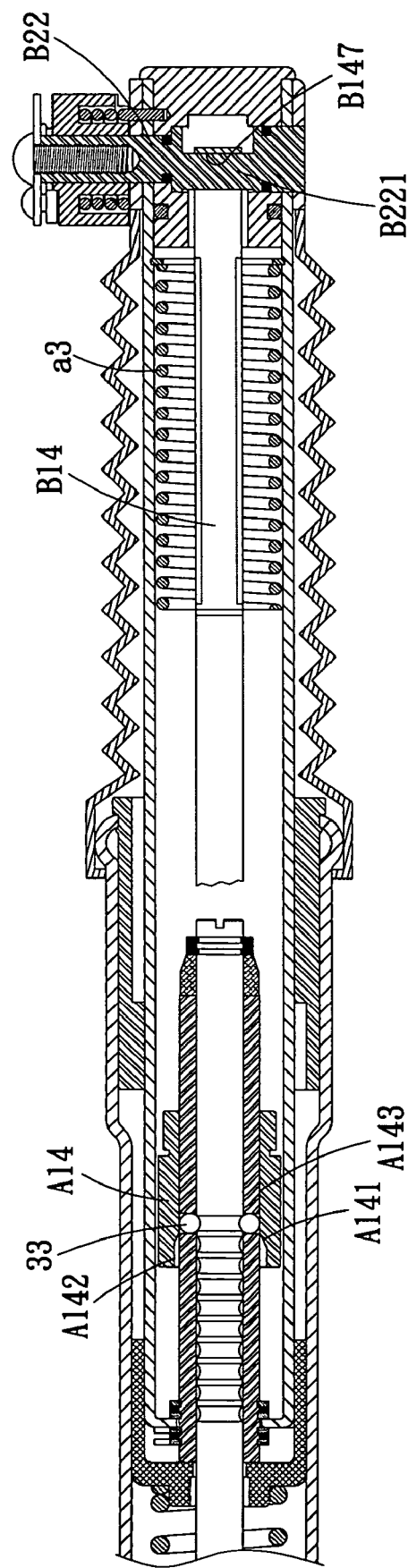
FIG. 17 is another cross sectional view in accordance with a fourth embodiment of the present invention for showing the shock absorber in a state of being locked.

Referring to FIGS. 15–17, a shock absorber in accordance with a fourth embodiment of the present invention and generally including a basement 90 having a base board 902, a clutch assembly A, a control assembly B, a shock-absorbing spring 91. The fourth preferred embodiment also has the same shock-absorbing function by changing the structural design of the abutting member B14, the control member A14 and the control spring a3 of the third embodiment, and the different structures are to be explained as follows:

The control member A14 is also mounted on the exterior periphery of the axial tube A11. However, the annular cone-shaped step portion A141, the big diameter portion A142 and the small diameter portion A143 of the control member A14 tilt the direction of the third embodiment. An end of the control member A14 is provided with groove A145. The abutting member B14 is formed with an abutting portion B146 at a position close to the mid portion thereof corresponding to the control assembly B. The control spring a3 is changed to abut against the portion between the abutting portion B146 of the abutting member B14 and the control assembly B. Furthermore, the front end of the abutting member B14 is provided with an actuating groove B147 for reception of the eccentric abutting portion B221 of the control shaft B22. And the portion B148 outside the actuating groove B147 of the abutting member B14 is moveably but non-rotatablly received in the square space B203 of the basement B20. The rear end of the abutting member B14 is provided with a locking protrusion B149 that is to be engaged in the groove A145 of the control member A14.

Referring to FIGS. 16 and 17, in which, the annular cone-shaped step portion A141, the big diameter portion A142 and the small diameter portion A143 are used to change the operational direction of the control element A14. The control spring a3 also can provide an elastic force having the same effect of the control spring a3 of the second embodiment when it is abutting against the portion between the abutting portion B146 of the abutting member B14 and the control assembly B. Thereby, the operational effect of the fourth embodiment is same as that of the third embodiment, the only difference is that the operation direction of the control spring a3 and the control member A14 is obviously changed.

On the other hand, the fourth embodiment provides another type operational manner via the cooperation of the actuating groove B147 and the eccentric abutting portion B221. And the actuating groove B147 is able to moveably abut against and position the eccentric abutting portion B221. Thereby, the actuating groove B147 will enable the abutting member B14 to be aligned with the relative position of the eccentric abutting portion B221, so as to produce the same effect as that of the afore-mentioned embodiments. The above-mentioned application of the fourth preferred embodiment is achieved by changing the structure of the abutting member, the control assembly and the control spring. However, the disclosed technical characteristics are identical to that of the other respective embodiments and may be made without departing from the scope of the present invention.

Figure 18:
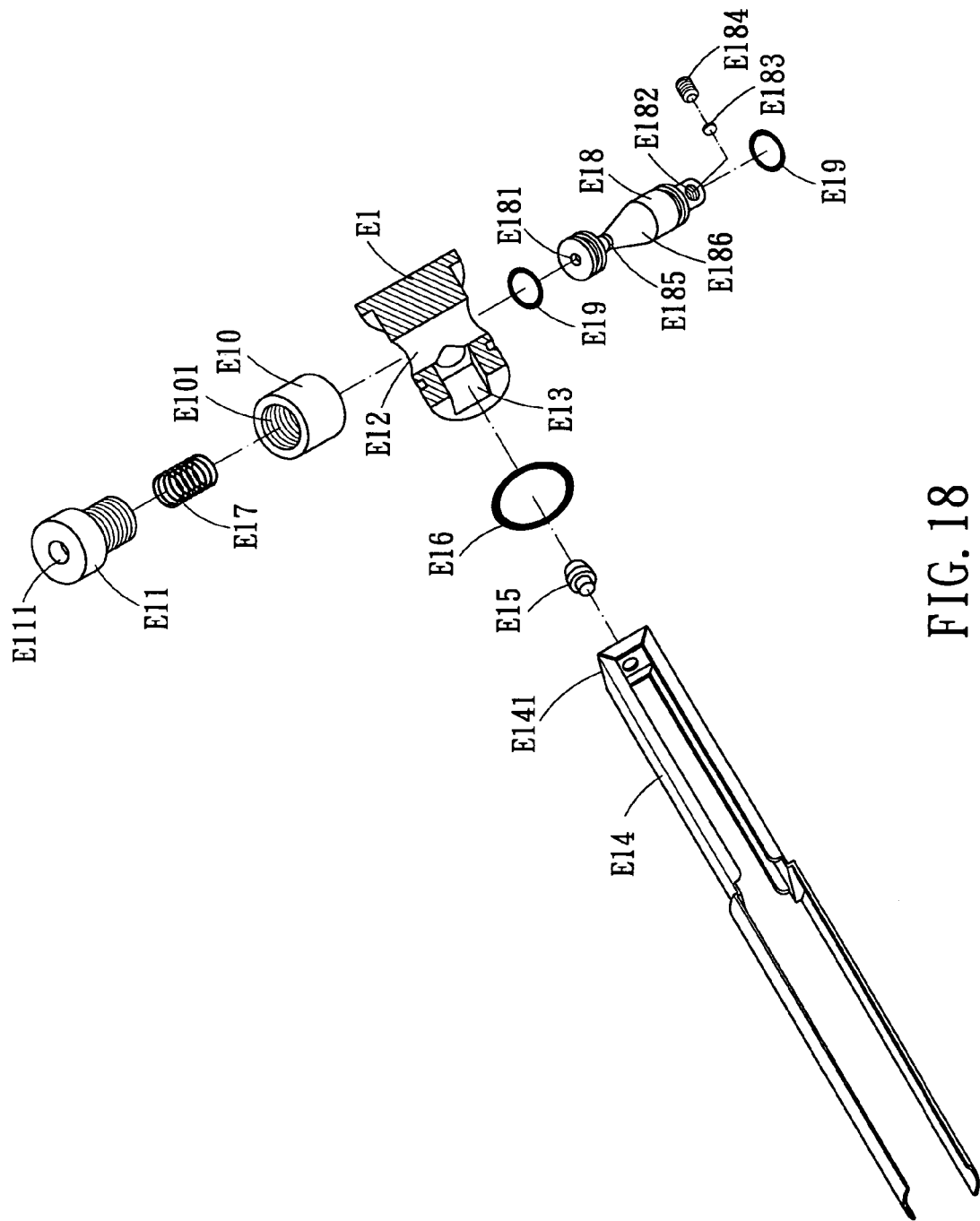
FIG. 18 is a cross sectional view of the shock absorber in accordance with a fifth embodiment of the present invention.
Figure 19:
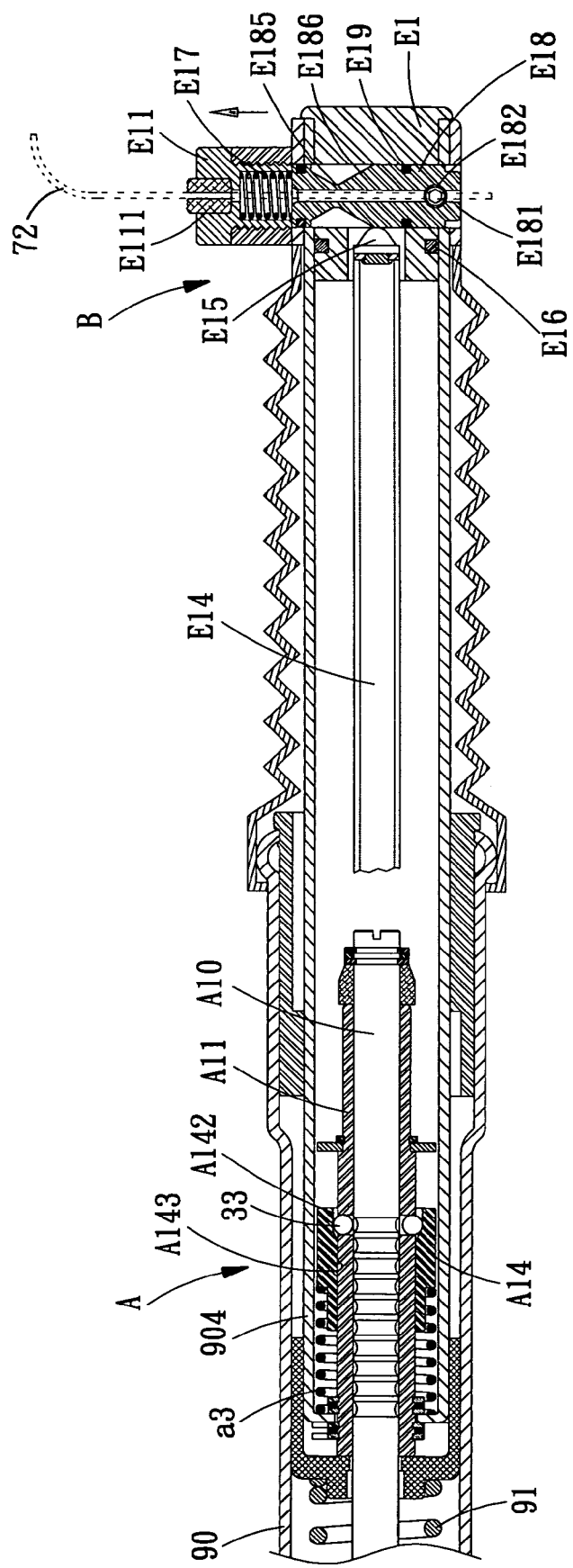
FIG. 19 is a cross sectional view in accordance with a fifth embodiment of the present invention for showing the shock absorber in a state of being unlocked.
Figure 20:
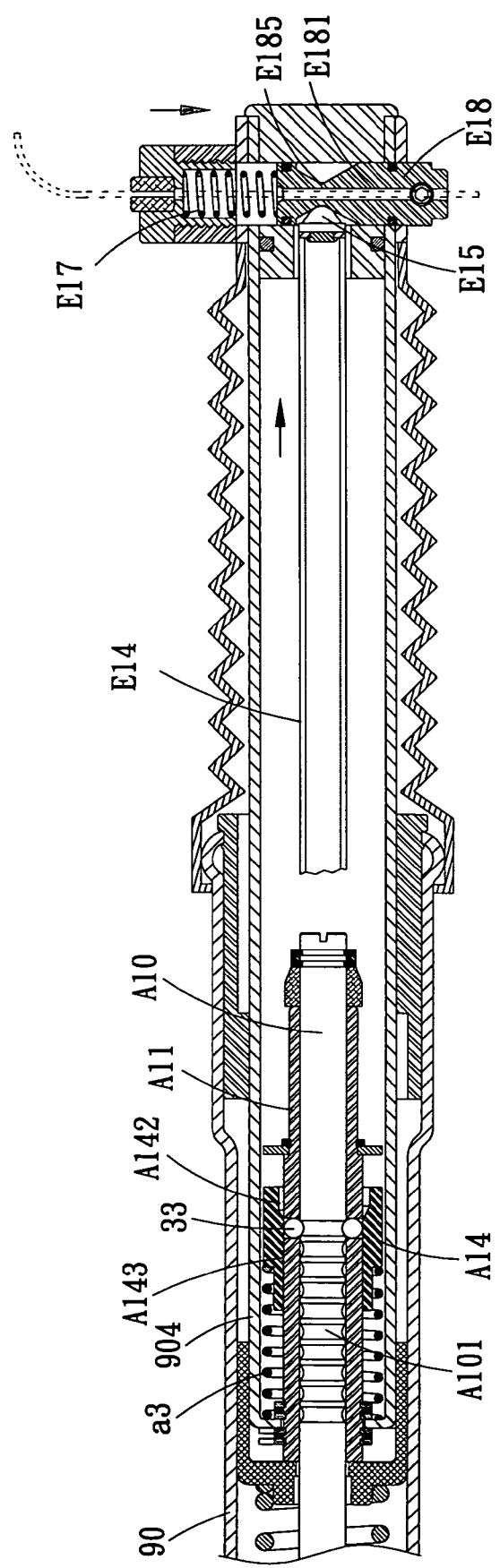
FIG. 20 is a cross sectional view in accordance with a fifth embodiment of the present invention for showing the shock absorber in a state of being locked.

Referring to FIGS. 18–20, a shock absorber in accordance with a fifth embodiment of the present invention is shown, which is the combination of the control assembly B of the first embodiment and the components of the second embodiment, generally including a basement 90 having a base board 902, a clutch assembly A, a control assembly B and a shock-absorbing spring 91. The fifth preferred embodiment also has the same shock-absorbing function by assembling the control assembly B of the first embodiment to the receiving tube 904 of the basement 90 of the second embodiment, and the different structures are to be explained as follows:

The abutting member E14 in the receiving tube 904 is provided at the utmost front end E141 with an arc shaft E15.

The basement E1 is fixed to the top end of the receiving tube 904 via a seal ring E16. A first end of the basement E1 is formed with a square space E13 for reception of the end E141 of the abutting member E14. The abutting member E14 is moveably but non-rotatablly disposed in the square space E13. The basement E1 is additionally provided with a control hole E12, a positioning bush E10 is fixed close to the control hole E12, and the control hole E12 passes through a side of the square space E13. The positioning bush E10 is interiorly formed with threaded hole E101, a back-moving spring E17 is confined in the control hole E12 by a positioning cover E11, and an end of the back-moving spring E17 abuts against the positioning cover E11.

The control shaft E18 inserts in the control hole E12 of the basement E1, an end of the control shaft E18 abuts against another end of the back-moving spring E17. A pair of seal rings E19 are respectively provided at both ends of the control shaft E18 so as to achieve a water-proof effect. A steel cord 72 inserts in the axial hole E181 of the control shaft E18 and then passes outward through the hole E111 of the positioning cover E11 (the steel cord is controlled by user). The control shaft E18 is further formed with a threaded hole E182 which is perpendicular to the axial hole E181 so as to fix the steel cord 72 via a cushion E183 and a screw E184. The control shaft E18 is annularly provided at the outer periphery thereof with a groove E185 and an annular cone-shaped surface E186 that correspond to the arc shaft E15 at the end of the abutting member E14.

Referring to FIGS. 19 and 20, the steel cord 72 cooperates with the back-moving spring E17 to control the movement of the control shaft E18. The position of the control shaft E18 determines the state of the abutting member E14 that the abutting member E14 either abuts against the big diameter portion of the annular cone-shaped surface E186 or slides into the groove E185.

If the arc shaft E15 of the abutting member E14 abuts against the big diameter portion of the annular cone-shaped surface E186 of the control shaft E18, the abutting member E14 in the receiving tube 904 will be pushed move the control element A14. Meanwhile, the control element A14 will make the clutch member 33 move toward the big diameter portion A142 of the control element A14, such that the positioning member A10 and the axial tube A11 are moveable relative to each other, and so are the basement 90 and the receiving tube 904. Thus, the function of shock absorbing is turned on.

If the control shaft E18 is moved by the back-moving spring E17 when the user pushes and releases a length of the steel cord, and the arc shaft E15 of the abutting member E1 engages in the groove E185, the control spring a3 will push the control element A14 to move. Meanwhile, the small diameter portion A143 of the control element A14 pushes the clutch member 33 into the positioning groove A101 of the positioning member A10. Through this way, the positioning member A10 is locked with the axial tube A11, so as to turn off the shock-absorbing function. The disclosed technical characteristics of this embodiment are identical to that of the other respective embodiments and may be made without departing from the scope of the present invention.

Figure 21:
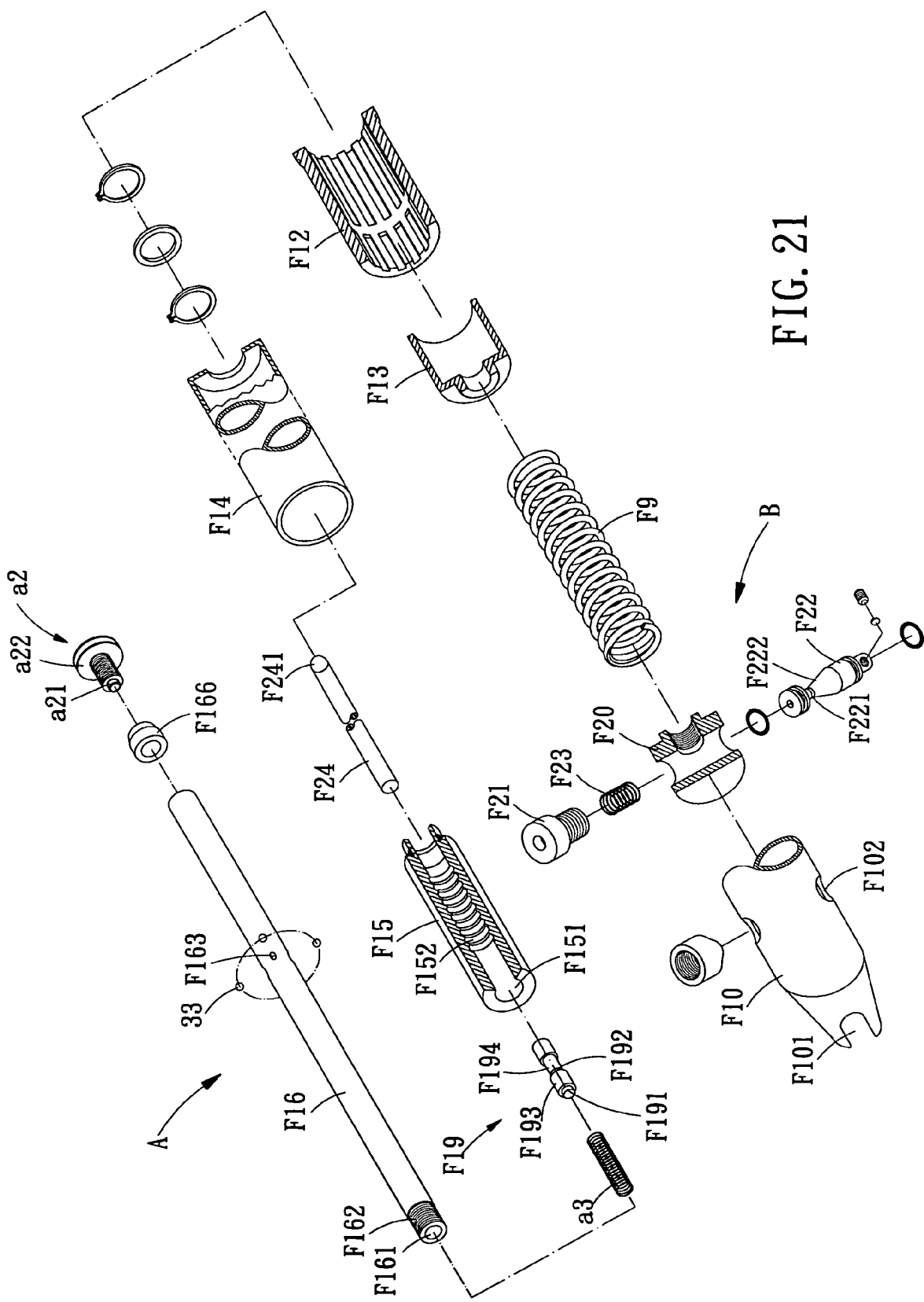
FIG. 21 is a cross sectional view of the shock absorber in accordance with a sixth embodiment of the present invention.
Figure 22:
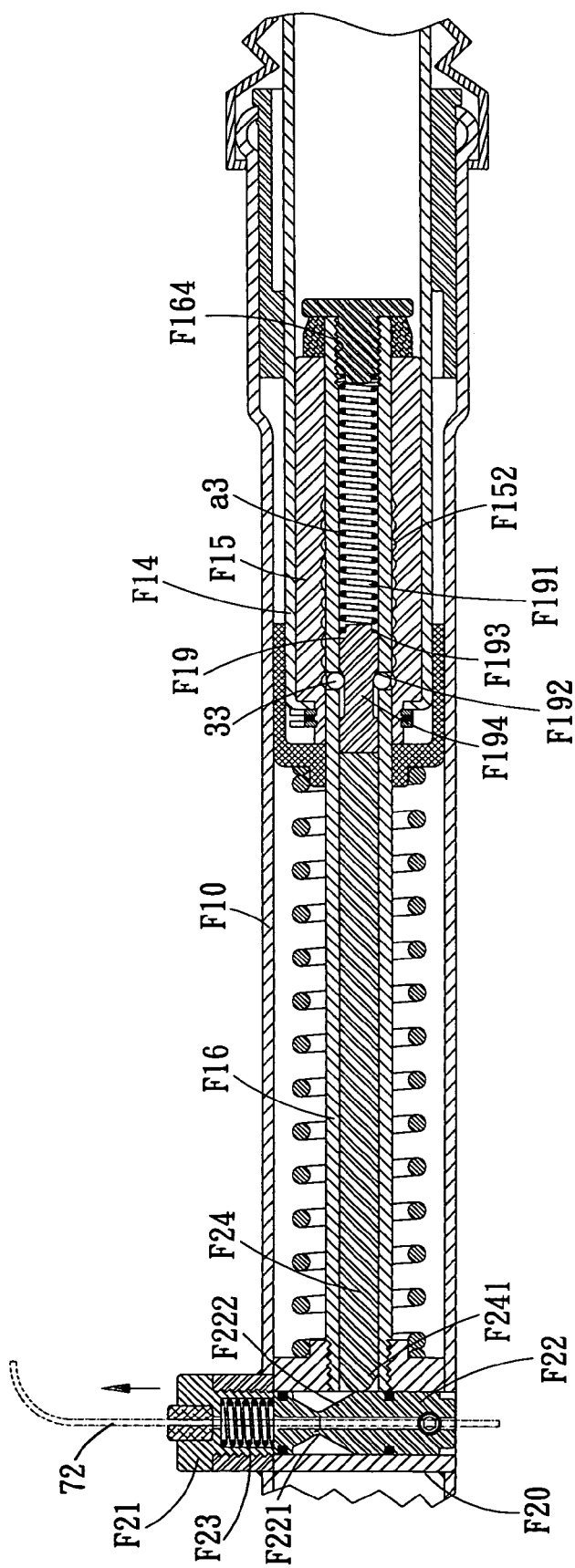
FIG. 22 is a cross sectional view in accordance with a sixth embodiment of the present invention for showing the shock absorber in a state of being unlocked.
Figure 23:
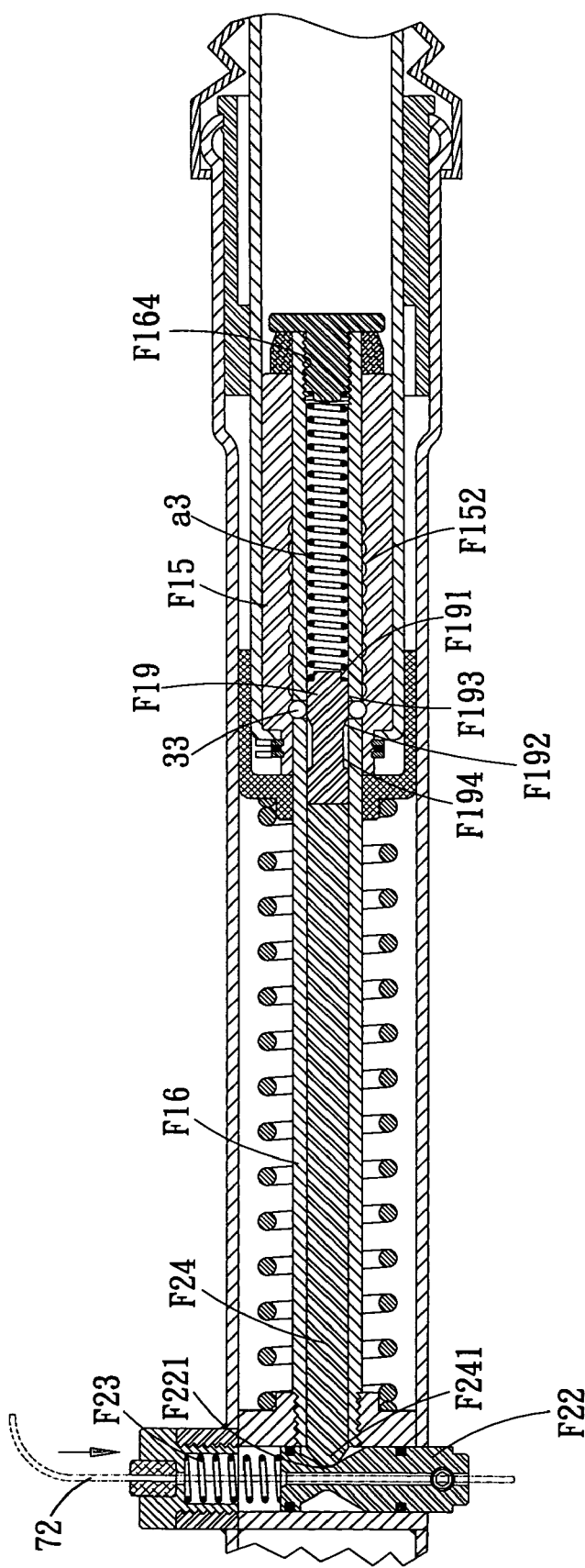
FIG. 23 is a cross sectional view in accordance with a sixth embodiment of the present invention for showing the shock absorber in a state of being locked.

Referring to FIGS. 21–23, a shock absorber in accordance with a sixth preferred embodiment of the present invention is shown and generally including: a base body F10, a clutch assembly A, a control assembly B and a shock-absorbing spring F9.

The base body F10, inside of which is received with a mid sleeve F12 and a slide bush F13 for reception of a receiving tube F14. The top end of the receiving tube F14 is fixed to the front fork of a bike. The slide bush F13 and the receiving tube F14 will move relative to the base body F10 when the bike is being affected by force. A through hole F102 is formed adjacent to the bottom of the base body F10, and a gap F101 at the lower end of the base body F10 is used to engage the wheel axle.

The clutch assembly A includes a positioning member F15, an axial tube F16, a clutch member 33, a control element F19.

The positioning member F15 is disposed in the receiving tube F14 of the base body F10, which is interiorly formed with a through hole F151, and plural positioning grooves F152 are formed on the inner wall of the positioning member F15.

The axial tube F16 is inserted in the through hole F151, of the positioning member F15 and interiorly formed with a through hole F161. A first end of the axial tube F16 is provided with outer threads F162. At a position corresponding to the positioning grooves F152 of the positioning member F15, the axial tube F16 is provided with a positioning hole F163. A second end of the axial tube F16 is formed with inner threads F164.

The clutch member 33 corresponds to the positioning grooves F152 of the positioning member F15 and to be received in the positioning hoe F163 of the axial tube F16.

The control element F19 is moveably inserted in the through hole F161 of the axial tube F16. On surface of a first end of the control element F19 is formed with a protrusion F191, and an annular cone-shaped step portion F192 is formed on the outer periphery of the control element F19 and serves to divide the control element F19 into a big diameter portion F193 and a small diameter portion F194.

The control assembly B is disposed in the through hole F102 at the bottom of the base body F10 and including: a base body F20, a positioning cover F21, a control shaft F22, a back-moving spring F23, an abutting member F24, a seal cover a2 and a control spring a3. The structure of the control shaft F22 is identical to that in the fifth embodiment. The steel cord 72 is controlled to move the control shaft F22, and the control shaft F22 also has a groove F221 and an annular cone-shaped surface F222 correspond to the arc surface F241 of the abutting member F24. The structure of the seal cover a2 is the same as that of the first embodiment, which is received in the through hole F161 of the axial tube F16 of the clutch assembly A and screwed with the inner threads F164 of the axial tube F16. A buffer cushion F166 is mounted to the annular periphery a22 of the seal cover a2. The detail structures would not be explained here.

As shown in FIG. 22, when the shock absorber is in use, the steel cord 72 is pulled by the user and drives the control shaft F22 to move, the movement of the control shaft F22 will make the abutting member F24 move to the big diameter portion of the annular cone-shaped surface F222. Meanwhile, the abutting member F24 is caused to move. The control element F19 is moved by the abutting member F24 (pushed by the elastic force of the control spring a3), so that the big diameter portion F193 of the annular cone-shaped step portion F192 of the control element F19 disengages from the clutch member 33 of the axial tube F16, and the clutch member 33 slides from the annular cone-shaped step portion F192 to the small diameter portion F194. In this case, the clutch member 33 will be disengaged from the positioning groove F152 of the positioning member F15. Thus, the axial tube F16 and the positioning member F15 are then able to move relative to each other, so as to absorb the shock of the bike.

As shown in FIG. 23, when the user wants to turned off the shock absorbing function, he only needs to push and releases a length of the steel cord 72. Then the control shaft F22 will be pushed by the back-moving spring F23 and moves back to the original position. Meanwhile, the movement of the control shaft F22 makes the abutting member F24 slide into the groove F221, and forms a space between the control member F19 and the abutting member F24. Thus, the control spring a3 pushes the control member F19 to move. Meanwhile, the big diameter portion F193 of the annular cone-shaped step portion F192 of the control member F19 pushes the clutch member 33 into the positioning groove F152 of the positioning member F15, such that the axial tube F16 and the positioning member F15 are unable to move relative to each other. Thus, the shock absorbing function is turned off.

Figure 24:
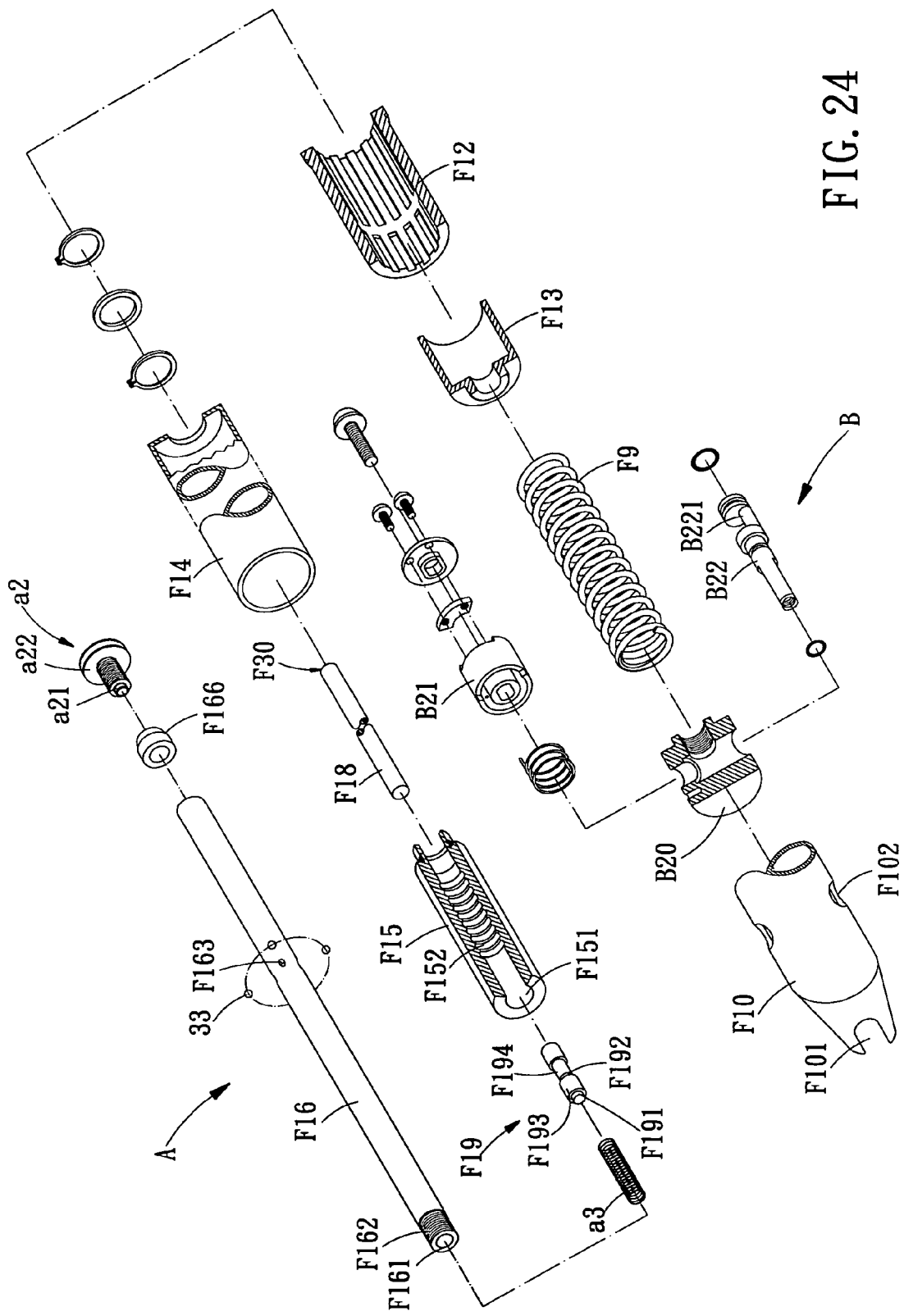
FIG. 24 is a cross sectional view of the shock absorber in accordance with a seventh embodiment of the present invention.
Figure 25:
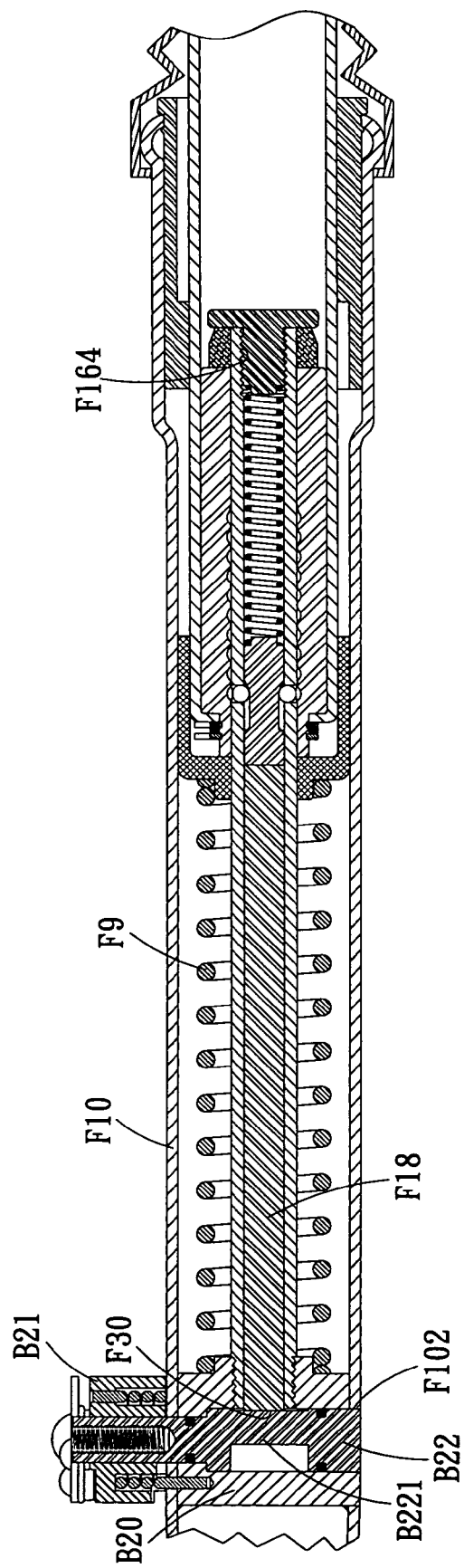
FIG. 25 is a cross sectional view in accordance with a seventh embodiment of the present invention for showing the shock absorber in a state of being unlocked.

Referring to FIGS. 24 and 25, a shock absorber in accordance with a seventh embodiment of the present invention is shown and which is the combination of the control assembly B of the third embodiment and the base body F10, the clutch assembly A and the shock-absorbing spring F9 of the sixth embodiment.

The base body B20, the rotary knob B21 and the control shaft B22 of the control assembly B are received in the through hole F102 of the base body F10 in a manner that the eccentric abutting portion B221 of the control shaft B22 abuts against the top flat surface F30 of the abutting member F18. The seventh preferred embodiment is the effective combination of the control assembly B of the third embodiment and the clutch assembly A of the sixth embodiment. The disclosed technical characteristics in this embodiment are identical to that of the other embodiments and may be made without departing from the scope of the present invention.

Figure 26:
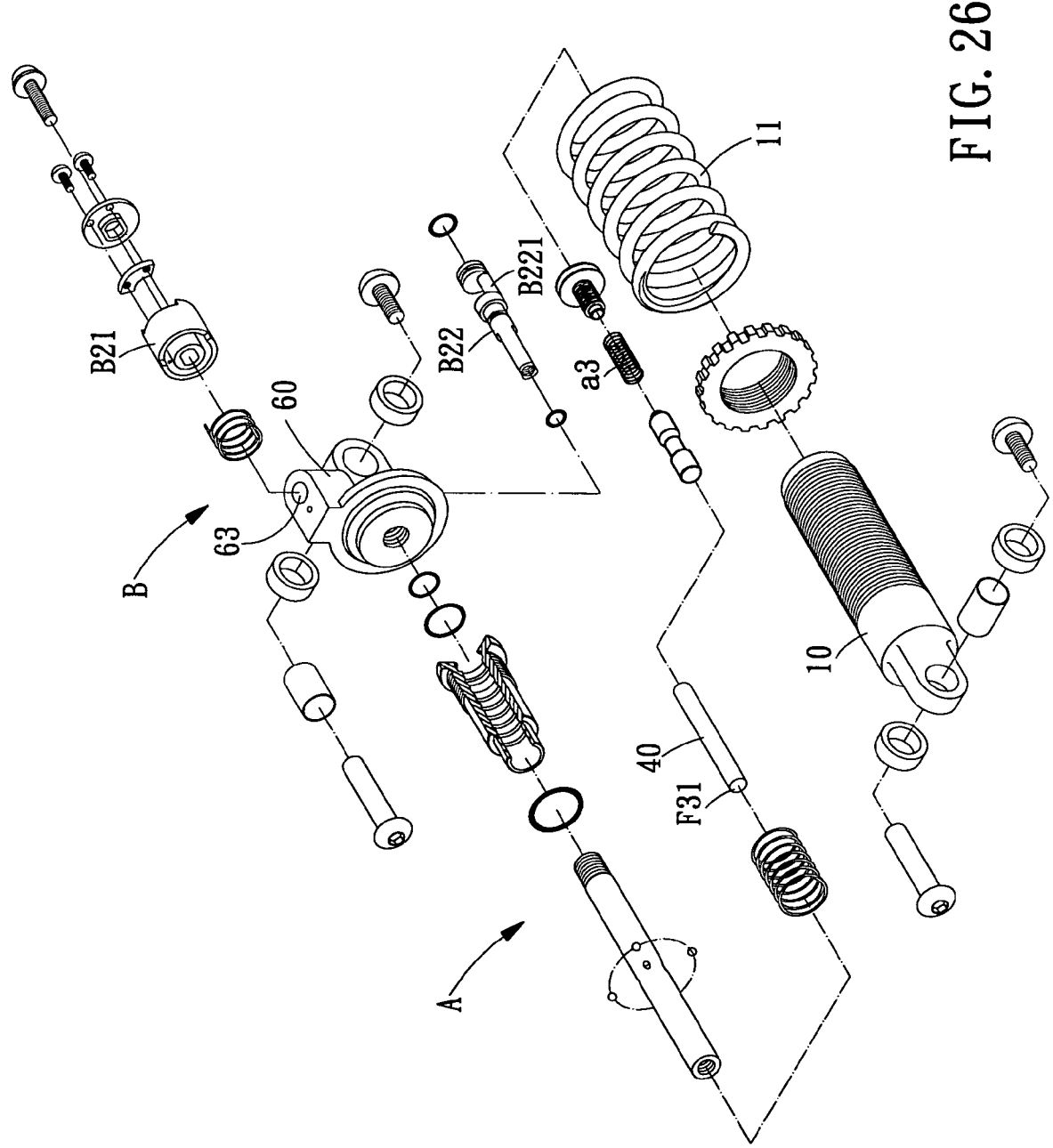
FIG. 26 is a cross sectional view of the shock absorber in accordance with a eighth embodiment of the present invention.
Figure 27:
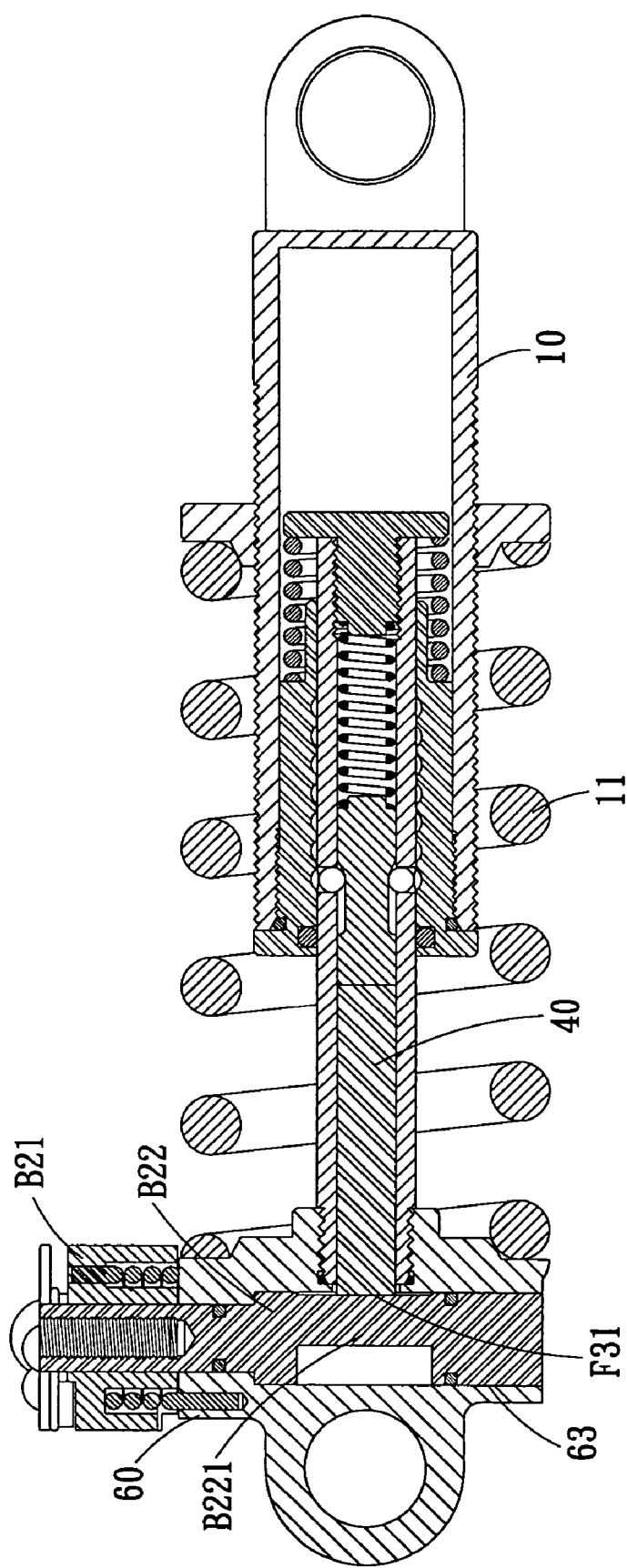
FIG. 27 is a cross sectional view in accordance with a eighth embodiment of the present invention for showing the shock absorber in a state of being unlocked.
Figure 28:
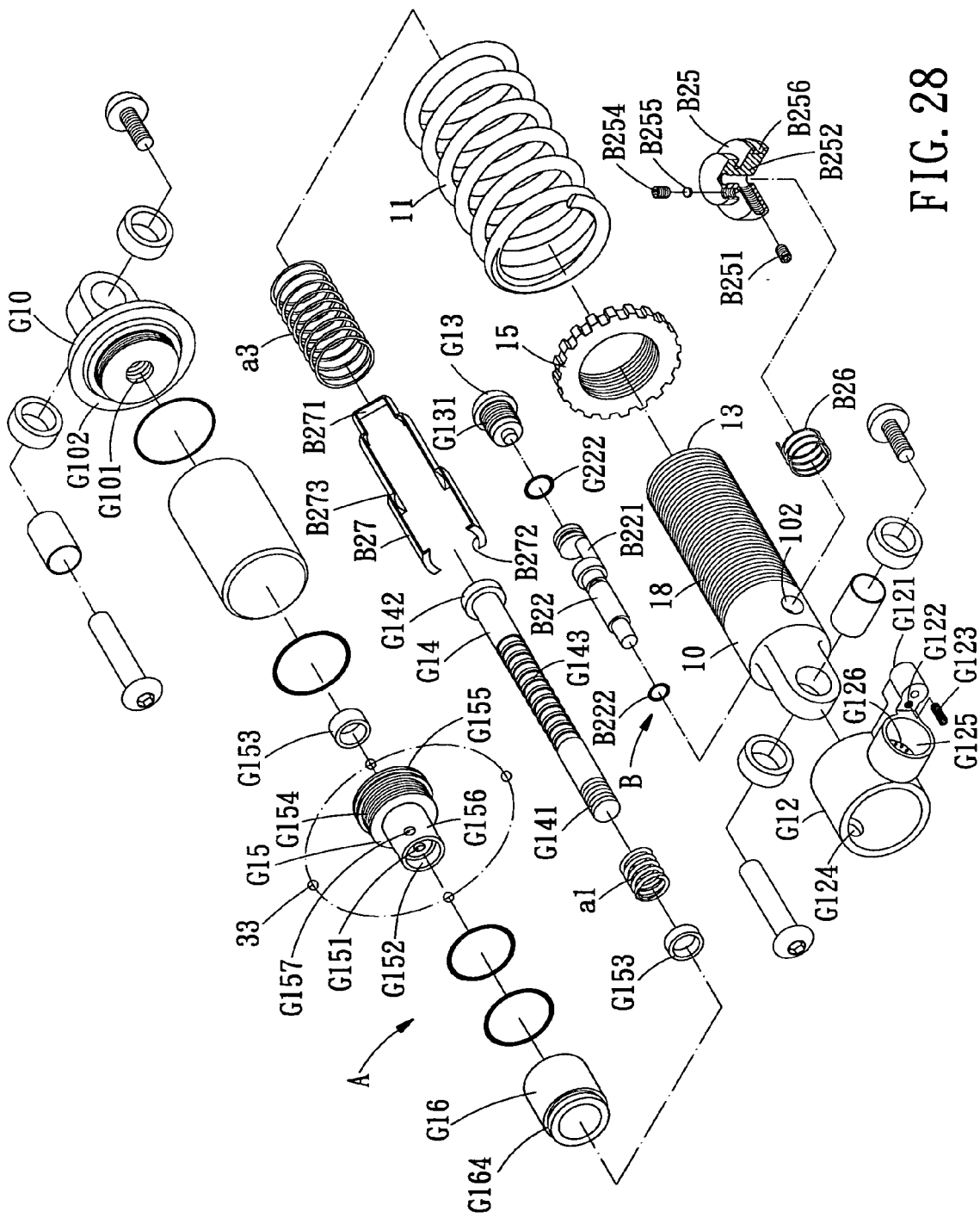
FIG. 28 is an exploded view of the shock absorber in accordance with a ninth embodiment of the present invention.
Figure 29:
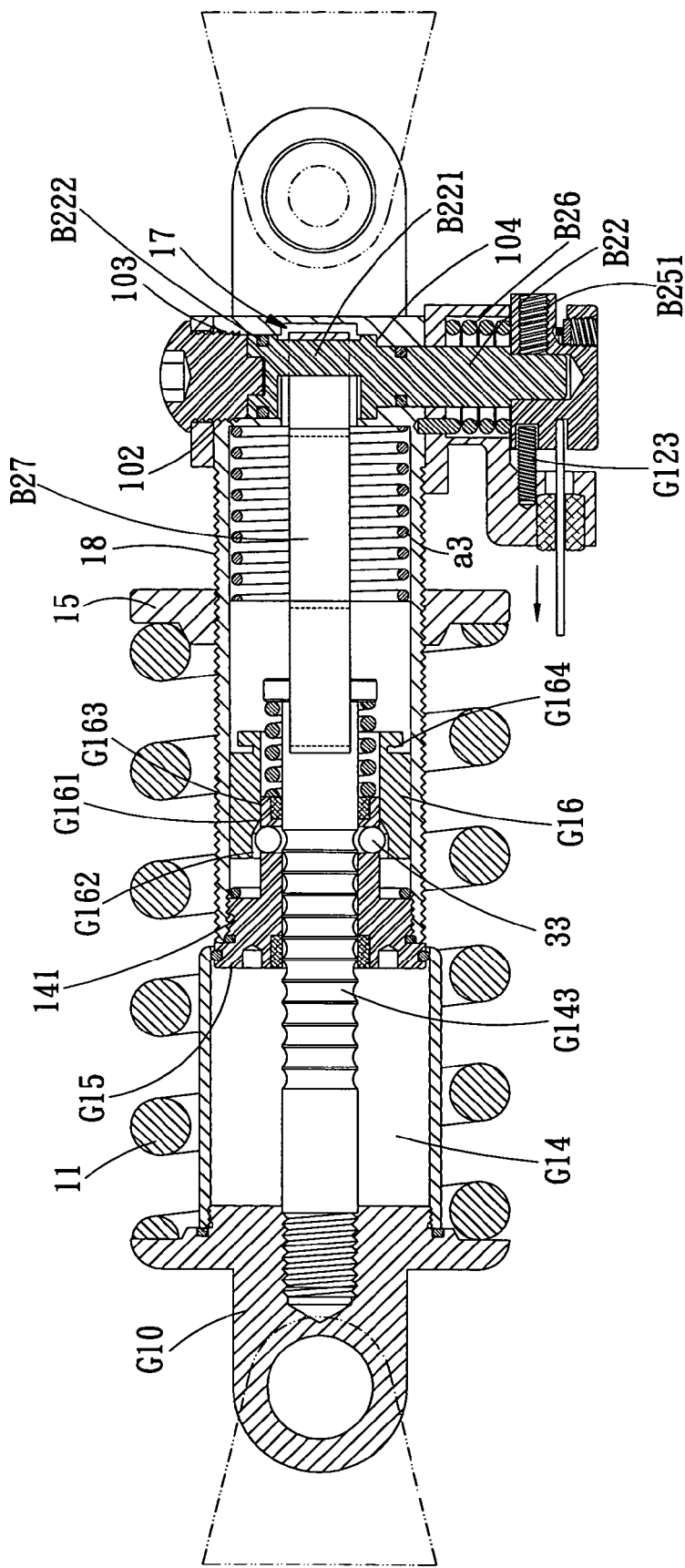
FIG. 29 is a cross sectional view in accordance with a ninth embodiment of the present invention for showing the shock absorber in a state of being unlocked.
Figure 30:
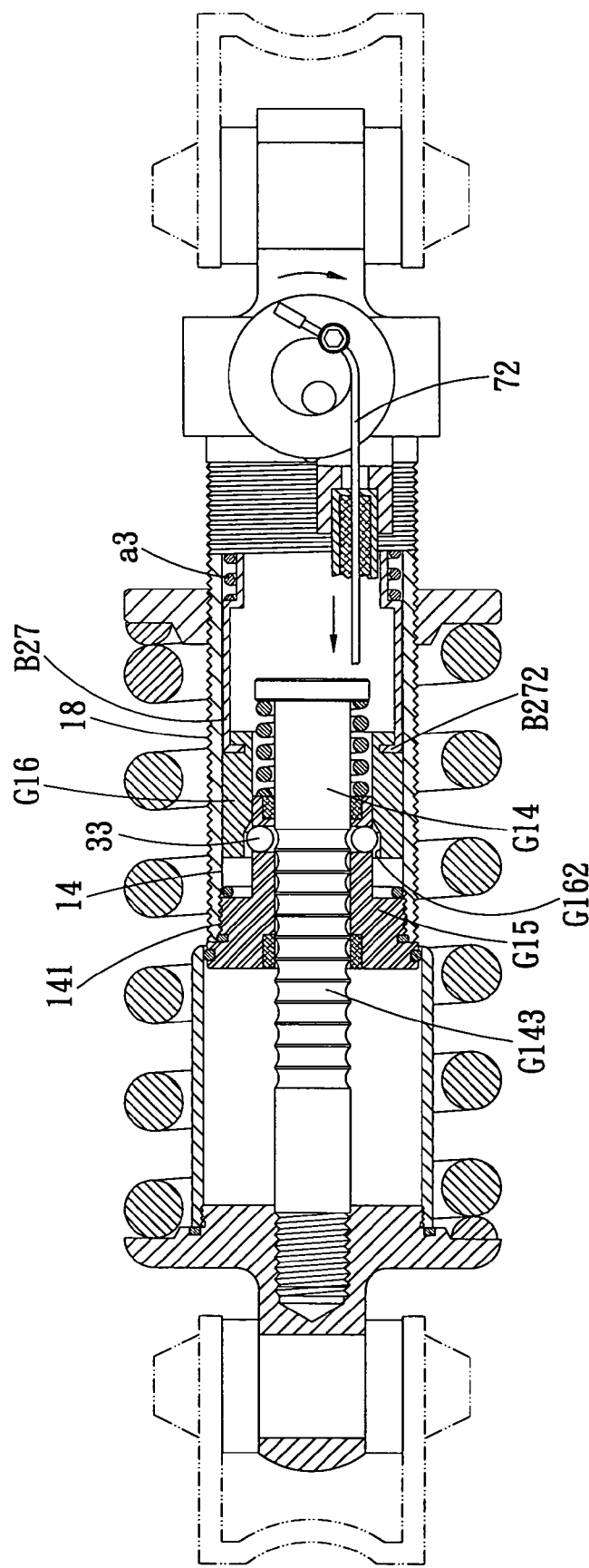
FIG. 30 is another cross sectional view in accordance with a ninth embodiment of the present invention for showing the shock absorber in a state of being unlocked.
Figure 31:
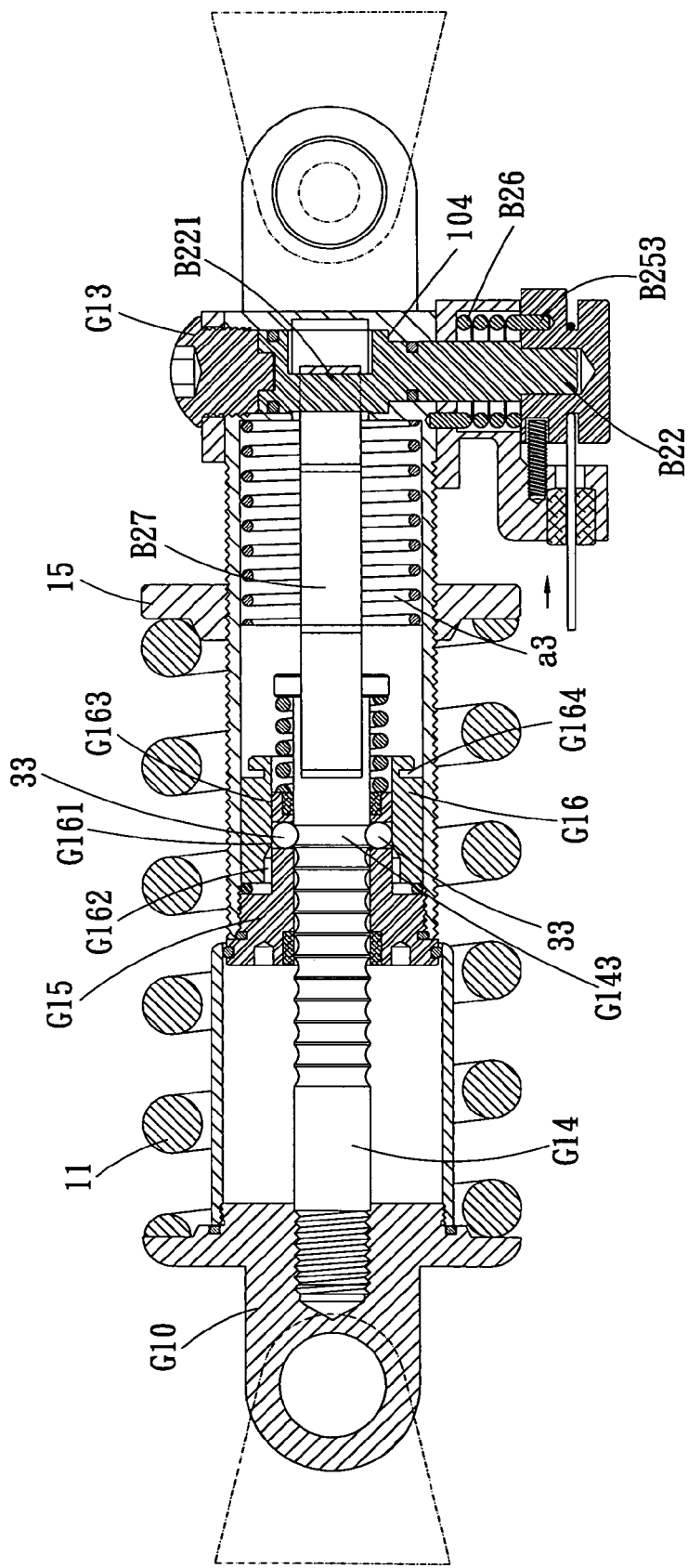
FIG. 31 is a cross sectional view in accordance with a ninth embodiment of the present invention for showing the shock absorber in a state of being locked.
Figure 32:
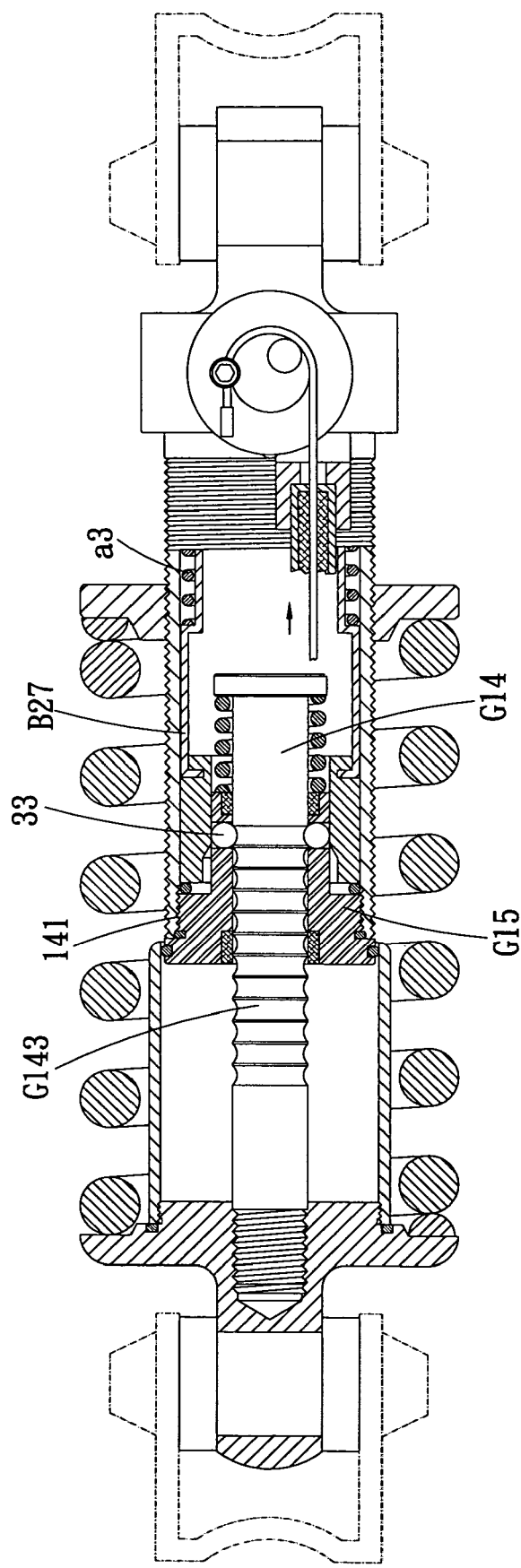
FIG. 32 is another cross sectional view in accordance with a ninth embodiment of the present invention for showing the shock absorber in a state of being locked.
Figure 33:
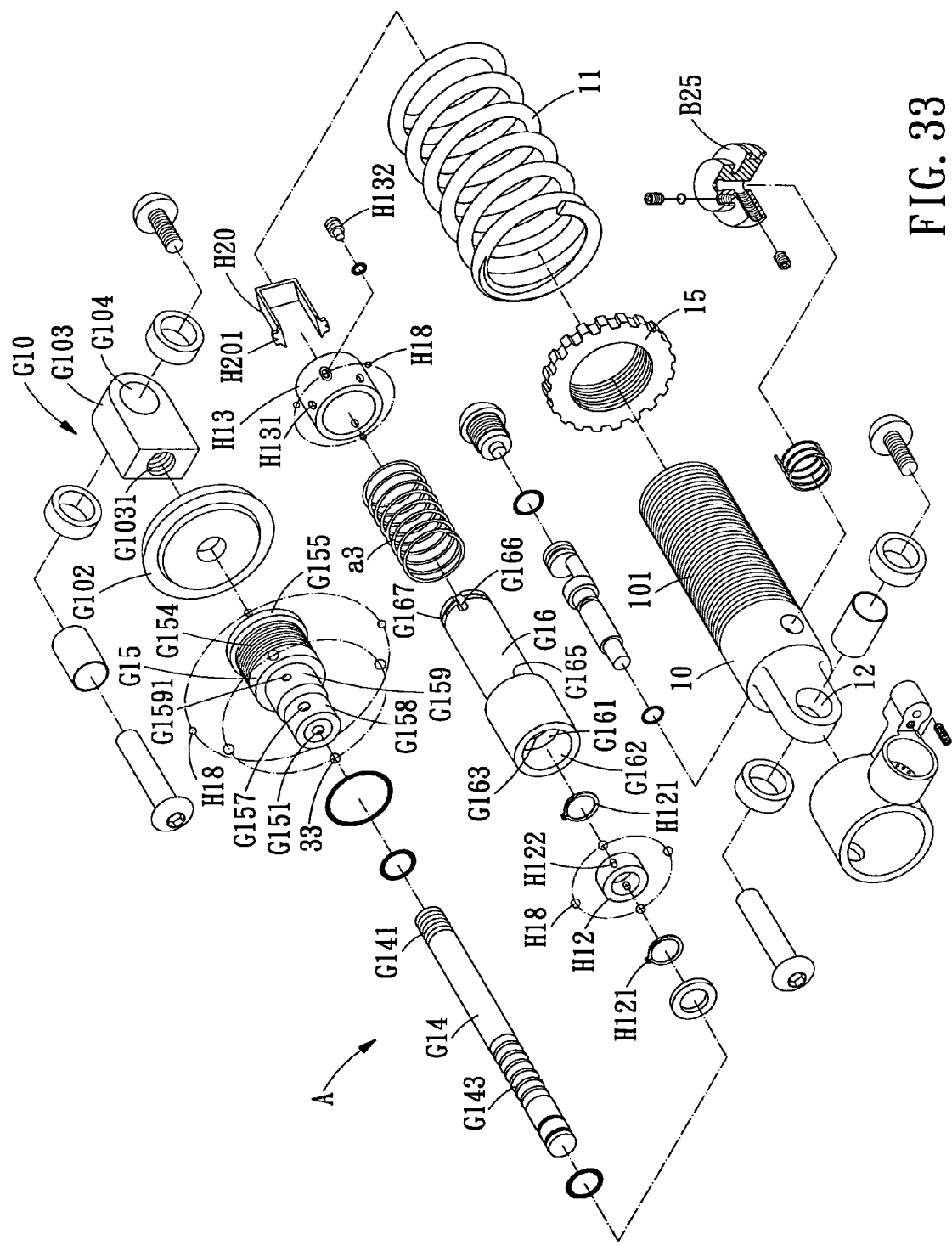
FIG. 33 is an exploded view of the shock absorber in accordance with a tenth embodiment of the present invention.
Figure 34:
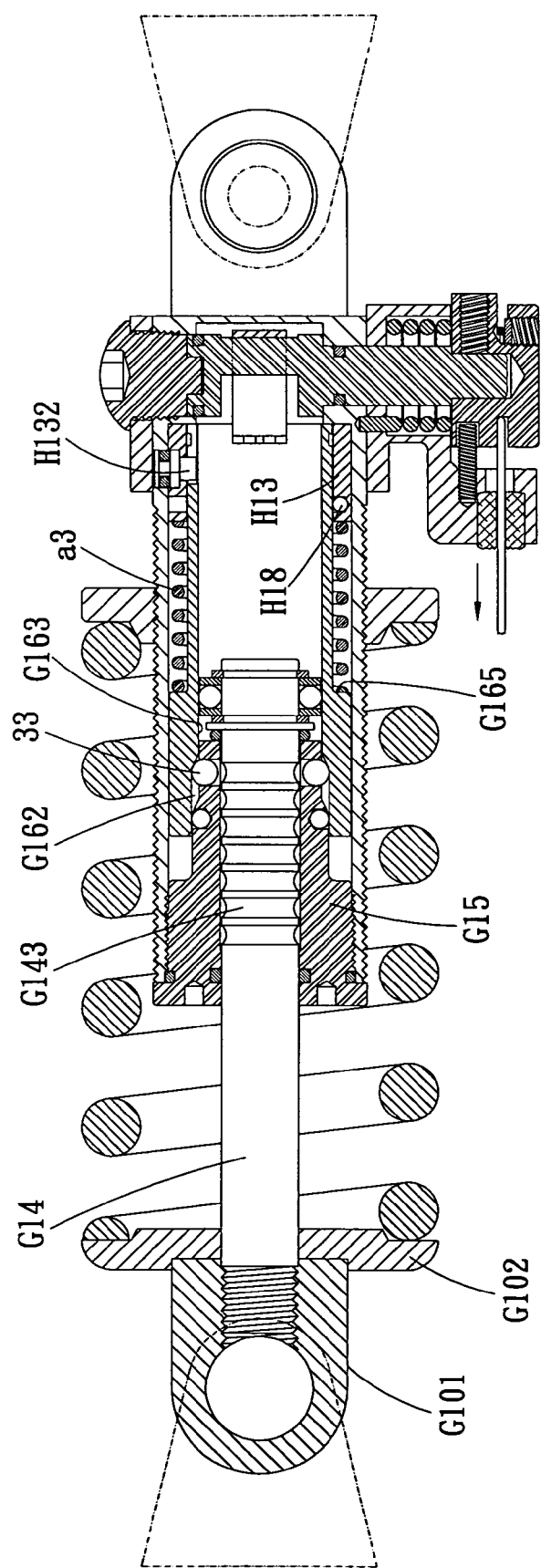
FIG. 34 is a cross sectional view in accordance with a tenth embodiment of the present invention for showing the shock absorber in a state of being unlocked.
Figure 35:
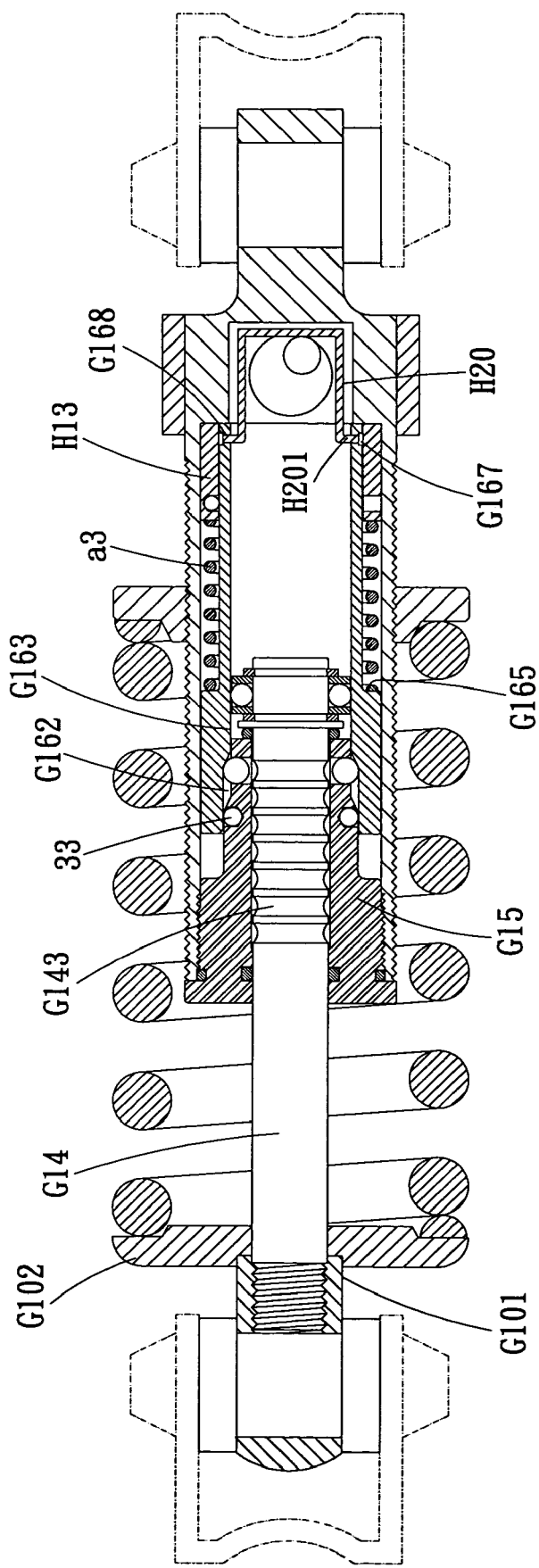
FIG. 35 is another cross sectional view in accordance with a tenth embodiment of the present invention for showing the shock absorber in a state of being unlocked.
Figure 36:
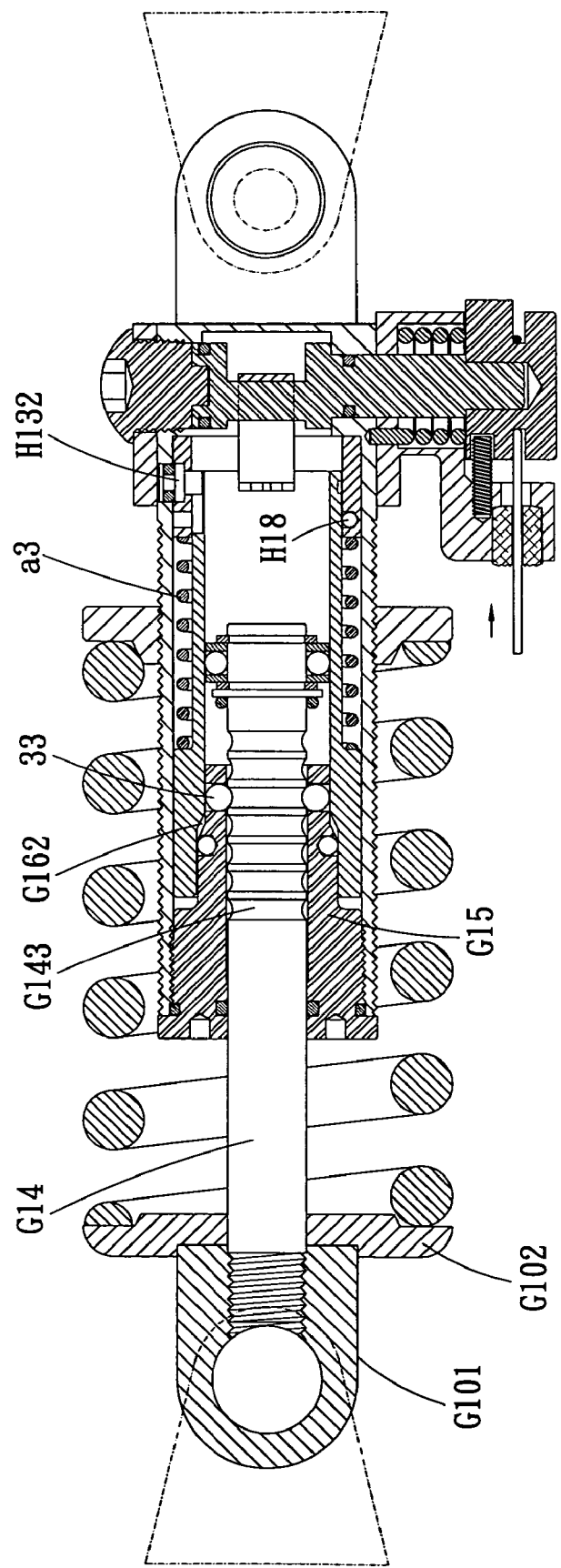
FIG. 36 is a cross sectional view in accordance with a tenth embodiment of the present invention for showing the shock absorber in a state of being locked.
Figure 37:
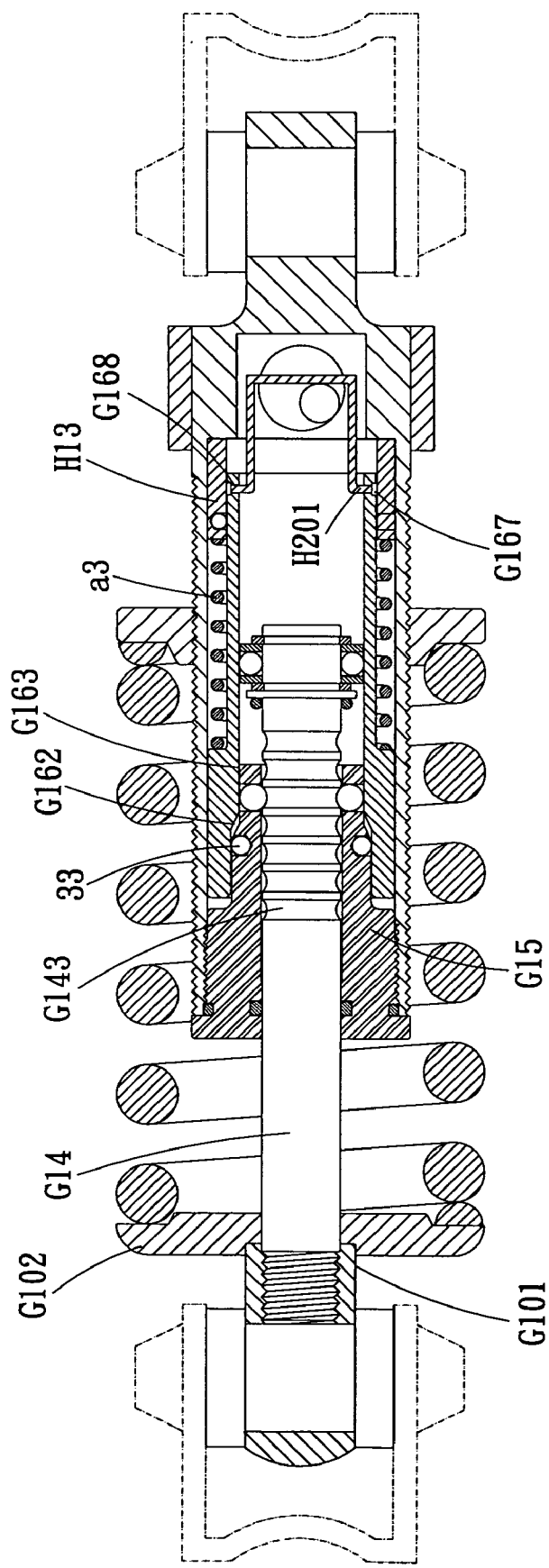
FIG. 37 is another cross sectional view in accordance with a tenth embodiment of the present invention for showing the shock absorber in a state of being locked.

Referring to FIGS. 26 and 27, a shock absorber in accordance with a eighth embodiment of the present invention is shown and which is the combination of the control assembly B of the third embodiment and the basement 10, the clutch assembly A and the shock-absorbing spring 11 of other embodiments.

The rotary knob B21 and the control shaft B22 of the control assembly B are received in the control hole 63 of the base body 60 (the base body B20 of the third embodiment is replaced with the base body 60 of other embodiments) in a manner that the eccentric abutting portion B221 of the control shaft B22 is abuts against the top flat surface F31 of the abutting member 40 (the top flat surface F31 substitutes for the arc surface 761). The disclosed technical characteristics in this embodiment are identical to that of the other embodiments and may be made without departing from the scope of the present invention.

Referring to FIGS. 28–32, a shock absorber in accordance with a ninth embodiment of the present invention is shown and which is the combination of the basement 10, the buffer spring a1 and the shock-absorbing spring 11 of other embodiments and the clutch assembly A and the control assembly B of the fourth embodiment. The control assembly B is disposed in the basement 10. Although the technical principle of the ninth embodiment is same as that of the afore-mentioned embodiments, the structure is a little different and to be explained as follows:

The shock absorber in this embodiment includes a basement 10 (interiorly equipped with control assembly), an upper basement G10, a clutch assembly A, a shock-absorbing spring 11 and a buffer spring a1.

The basement 10 includes an adjust ring 15, a steel-cord basement G12, a positioning cover G13, a control shaft B22, a rotary knob B25, a back-moving spring B26, an abutting member B27 and a control spring a3.

The basement 10, a first end of which is provided with a mouth 13 which is in communication with a space 14 formed inside the basement 10. On the inner wall of the space 14 adjacent to the mouth 13 is formed with inner threads 141. A square space 17 is formed close to the bottom 16, and outer threads 18 are formed on the outer periphery of the basement 10 and employed to mesh with the adjust ring 15. A second end of the basement 10 is fixed to the body of a bike, and a control hole 102 is formed on the periphery of the second end. A first end of the control hole 102 is provided with threads 103, while a second of which is formed with an inner flange 104.

The steel-cord basement G12 is interiorly formed with a space and mounted on the outer periphery of the basement 10. A first end of the steel-cord basement G12 is provided with a bearing seat G121 which is used to fix the steel cord 72, adjacent to the bearing seat G121 is formed a threaded hole G122 and in which is screwed with a screw G123. A receiving hole G124 is formed on the peripheral wall of the steel-cord seat G12, and on the peripheral wall opposite the receiving hole G124 is further formed a recess G125. The bottom of the recess G125 is formed with plural spring-insertion holes G126.

The positioning cover G13 has a first end formed with outer threads G131 which are screwed with the inner threads 103 in the control hole 102 of the basement 10 after passing through the receiving hole G124 of the steel-cord basement G12.

The control shaft B22, after passing through the receiving hole G124 of the steel-cord basement G12, is received in the control hole 102 of the basement 10 via two seal rings B222. A first end of the control shaft B22 in positioned by the inner flange 104 in the control hole 102 of the basement 10. A second end of the control shaft B22 is positioned and screwed with the outer threads G131 of the positioning cover G13. The control shaft B22 is further provided with an eccentric abutting portion B221.

The rotary knob B25 is fixed to the outer periphery of the control shaft B22 by the screw B25. On the outer periphery B252 of a first end of the rotary knob B25 is formed with spring-insertion hole B253. A second end of the rotary knob B25 is used to fix the steel cord 72 via screw B254 and positioning cushion B255. On the outer periphery of the rotary knob B25 is formed with an arc groove B256 which is cooperated with the screw G123 in the threaded hole G122 of the steel-cord basement G12, so as to limit the rotating angle of the rotary knob B25.

The back-moving spring B26 serves to provide tension force in a predetermined direction and to be received in the receiving groove G125 of the steel-cord basement G12. A first end of the back-moving spring B26 is inserted in the spring-insertion hole G126 of the steel-cord basement G12, and a second end of which is inserted in the spring-insertion hole B253 of the rotary knob B25.

The abutting member B27, a first end of which is fixed in the squared space 17 of the basement 10 and unable to rotate cause restricted by the square space 17. The first end of the abutting member B27 is formed with an actuating groove B271 for reception of the eccentric abutting portion B221 of the control shaft B22. A second end of the abutting member B27 is provided with locking protrusion B272, and on the abutting member B27 adjacent to the mid portion is formed with an abutting portion B273.

The control spring a3 is biased between the abutting portion B273 of the abutting member B27 and the bottom of the space 14 of the basement 10.

The upper basement G10, a first end of which is coupled to the bike and a second of which is interiorly formed with inner threads G101. A flange G102 is formed the outer surface of the upper basement G10 for positioning a spring.

The clutch assembly A includes a positioning member G14, an axial tube G15, a clutch member 33 and a control element G16.

The positioning member G14, a first end of which is provided with outer threads G141 which are to be meshed with the inner threads G101 of the upper basement G10, a second end of which is provided with an annular protrusion G142. Adjacent to the mid portion of the positioning member G14 is formed with plural positioning grooves G143.

The axial tube G15 is interiorly formed with a through hole G151 for insertion of the positioning member G14. Both ends of the through hole G151 are respectively formed with an expanding hole G152 for reception of a wearing slide bush G153. A first end of the axial tube G15 is provided with outer threads G154, and on the outer periphery of this end is formed with a flange G155, such that the axial tube G15 can be screwed with the inner threads 141 in the space 14 of the basement 10. A second end of the axial tube G15 is formed with step periphery G156, and on the peripheral surface of the step periphery G156 is formed with a positioning hole G157 that corresponds to the plural positioning grooves G143 of the positioning member G14.

The clutch member 33 is moveably disposed in the positioning hole G157 of the axial tube G15.

The control element G16 is moveably mounted on the outer periphery of the axial tube G15. An annular cone-shaped step portion G161 is formed in inner space of the control element G16, which divides the control element G 16 into a big diameter portion G 162 and a small diameter portion G 163. An end of the control element G 16 corresponding to the small diameter portion G163 is formed with a groove G164 for engaging with the locking protrusion B272 of the abutting member B27.

The shock-absorbing spring 11, a first end of which abuts against the adjust ring 15 of the basement 10, and a second end of which abuts against the flange G102 on the basement G10.

The buffer spring a1 is biased between the annular protrusion G142 of the positioning member G14 and the step periphery G156 of the axial tube G15.

When the user turn on the shock-absorbing function by pulling a length of the steel cord 72, the eccentric abutting portion B221 of the control shaft B22 is moved by the steel cord 72. Meanwhile, the front end of the abutting member B27 is moved by the eccentric abutting portion B221. The movement of the abutting member B27 will cause a movement of the control element G16 since the locking protrusion B272 of the abutting member B27 engages in the groove G164 of the control element G16. Thus, the control spring a3 is accordingly compressed. In this case, the clutch member 33 will be received in the big diameter portion G162 along with the movement of the control element 16, so that the positioning member G14 and the axial tube G15 are moveable relative to each other. Through this way, the shock-absorbing function is turned on. When the user pushes and releases the steel cord, the back-moving spring B26 will rotate the control shaft B22 and make it back to the original position. Accordingly, a space is formed between the eccentric abutting portion B221 and the abutting member B27, which allows the control spring a3 to move the abutting member B27 and then to move the control element G16. Then the small diameter portion G163 of the control element G16 pushes the clutch member 33 and make it engage in the positioning groove G143 of the positioning member G14, such that the positioning member G14 is locked with the axial tube G15. Thus, the shock-absorbing function is turned off.

Referring to FIGS. 33–37, a shock absorber in accordance with a tenth preferred embodiment of the present invention is shown and including a basement 10, an upper basement G10, a clutch assembly A and a shock-absorbing spring 11. The shock absorber in this embodiment adds an aid-sliding member H18 to the components of the ninth embodiment.

The basement 10 of this embodiment is identical with that of the ninth embodiment, which contains control assembly. A first end of the basement 10 is formed with a hole 12 which is to be engaged with the bike. An adjust ring 15 is screwed with the outer threads 101 on the basement 10. In the space 14 of the basement 10 close to the bottom thereof is disposed an inner slide bush H13 which is equipped with a steel-ball seat H131 for reception of the aid-sliding member H18. A positioning tip H132 is arranged between the basement 10 and the inner slide bush H13.

The upper basement G10 includes a block G103 and a flange G102. A first end of the block G103 is provided with hole G104 which is to be engaged with the bike, a second end of the block G103 is formed with inner threads G1031.

The clutch assembly A includes positioning member G14, axial tube G15, clutch member 33 and control element G16.

The outer threads G141 at a first end of the positioning member G14 are meshed with the inner threads G1031 of the block G103 of the upper basement G10. A second end of the positioning member G14 is used to fix a supporting seat H12 via two retaining members H121. The supporting seat H12 is provided at the peripheral side thereof with a through hole H122 for reception of plural aid-sliding member H18. On the outer periphery of the positioning member G14 is formed with plural positioning grooves G143.

The axial tube G15 is interiorly formed with a through hole G151. A first end of the axial tube G15 is provided with outer threads G154 and a protrusive flange G155 that are to be received in the space 14 of the basement 10. A second end of the axial tube G15 is provided with a first step periphery G158, on the outer surface of the first step periphery G158 is formed a positioning hole G157. Beside the positioning hole G157 is provided a second step periphery G159. The steel-ball seat G1591 is formed on the outer surface of the second step periphery G159 for reception of plural aid-sliding members H118.

The clutch member 33 is disposed in the positioning hole G157 of the axial tube G15 and corresponds to the plural positioning grooves G143 of the positioning member G14.

The control element G16, a first end of which is moveably disposed on the outer surface of the second step periphery G159 of the axial tube G15. An annular cone-shaped step portion G161 is formed in the control element G16 and divides the control element G16 into a big diameter portion G162 and a small diameter portion G163. Adjacent to the mid portion of the control element G16 is further provided an abutting portion G165. A second end of the control element G16 is slidably disposed in the inner slide bush H13 of the basement 10, and on the out periphery of this second end is formed with a positioning groove G166 and a groove G167. The positioning groove G166 serves to position the positioning tip H132 that is disposed in the basement 10 and the inner slide bush H13, so that the control element G16 can be moveably but non-rotatably disposed in the inner slide bush H13 and on the outer surface of the second periphery G159 of the axial tube G15. The aid-sliding members H18 of the inner slide bush H13, the positioning member G14 and the axial tube G15 can enable the control element G16 to slide smoothly and stably. The aid-sliding members H18 disposed at the end of the positioning member G14 also can enable the positioning member G14 to smoothly and stably slide in the control element G16. Furthermore, the groove G167 formed at the end of the control element G16 is interiorly formed with two connecting holes G168 for respectively fixing two legs H201 of a connecting member H20.

The control spring a3 is biased between the abutting portion G165 of the control element G16 and an end of the inner slide bush H13.

The shock-absorbing spring 11 is biased between the adjust ring 15 and the flange G102 of the upper basement G10.

The disclosed technical characteristics of this embodiment are identical to that of the other respective embodiments and may be made without departing from the scope of the present invention.

Figure 38:
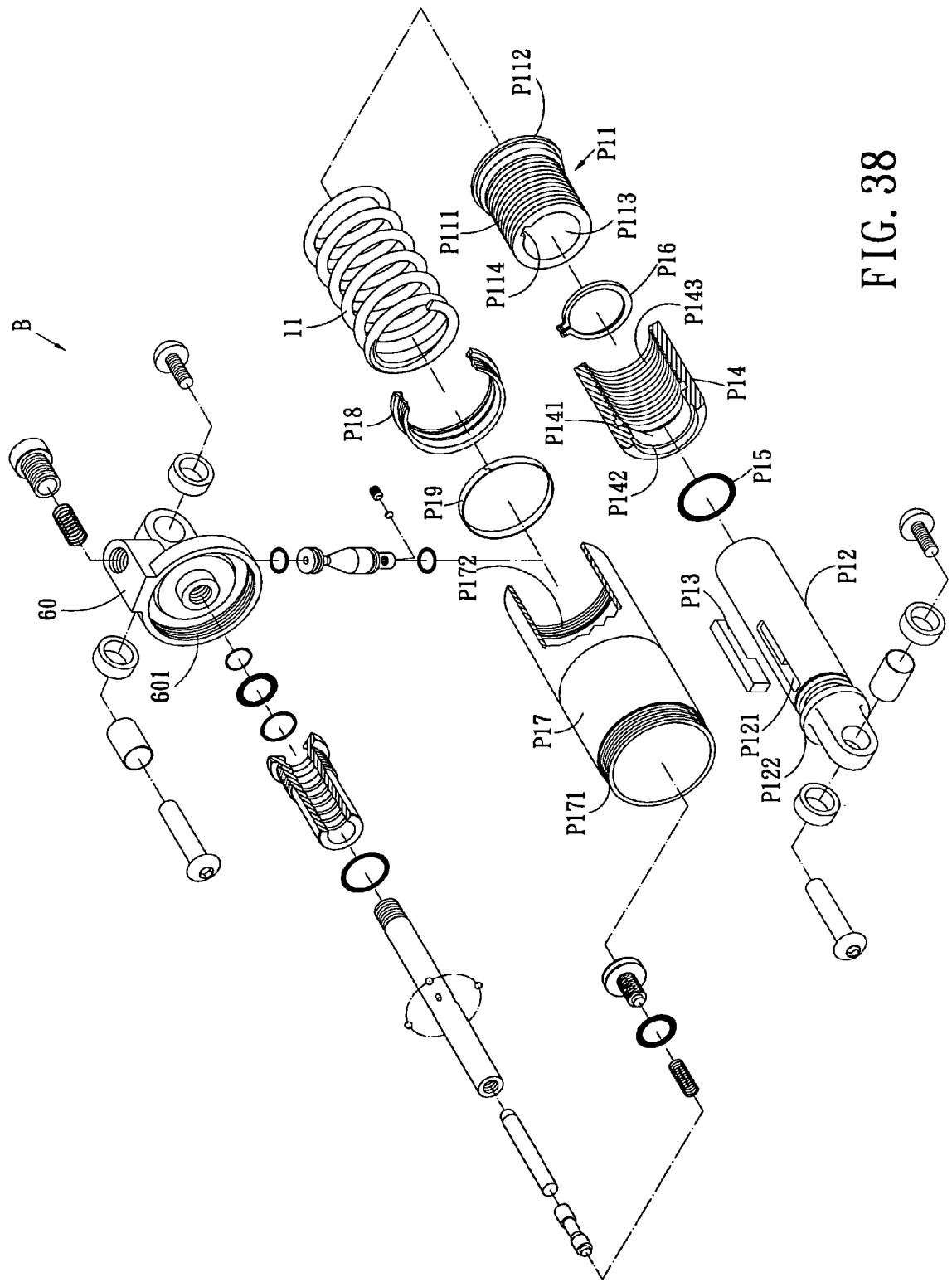
FIG. 38 is an exploded view of the shock absorber in accordance with an eleventh embodiment of the present invention.
Figure 39:
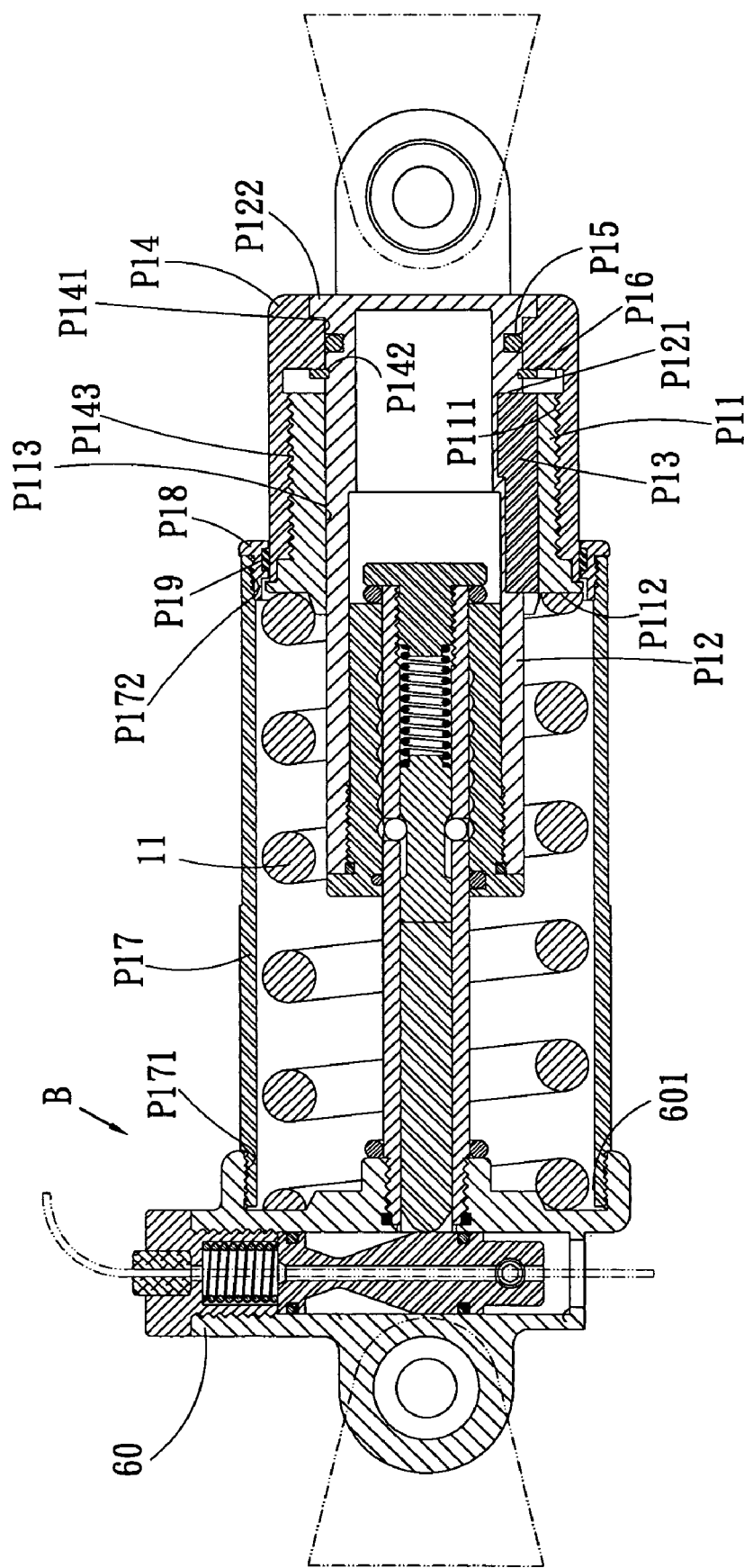
FIG. 39 is a cross sectional view in accordance with a eleventh embodiment of the present invention for showing the shock absorber in a state of being unlocked.

Referring to FIGS. 38 and 39, a shock absorber in accordance with a eleventh embodiment of the present invention is shown, which moves the outer threads 101 of the basement 10 to the outer surface of a moveable ring P11. The moveable ring P11 is mounted on the outer periphery of the basement P12. On the outer periphery of the basement P12 is formed with a locking slot P121, a flange P122 and an annular groove P123. The moveable ring P11 is provided on the outer periphery with outer threads P111, and on another side of the outer periphery is further formed with a flange P112 which to be abutted by an end of the shock-absorbing spring 11. An inner hole P113 and a locking groove P114 are defined in the moveable ring P11. The inner hole P113 engages with the basement P12. In the locking slot P121 of the basement P12 and the locking groove P114 of the moveable ring P11 is disposed a positioning key P13 which enables the moveable ring P11 to be moveably but non-rotatably mounted on the outer periphery of the basement P12. An adjust ring P14 is interiorly provided at a side thereof with an inner hole P141 and an inner flange P142, at another side of the inner wall of the adjusting ring P14 is formed with inner threads P143. The inner hole P141 of the adjust ring P14 serves to engages with an end of the outer periphery of the basement P12 via a seal ring 15. The inner flange P142 is positioned to the flange P122 of the basement P12, and then with the help of a retaining ring P16, the adjust ring P12 is rotatably but immovably mounted on the outer periphery of the basement P12. The inner threads P143 inside the adjust ring P14 are meshed with the outer threads P111 on the moveable ring P11 so as to transmit motion. When the adjust ring P14 rotates, the moveable ring P11 is actuated to move, meanwhile, the compressing force of the shock-absorbing spring 11 is adjusted. The base body 60 of he control assembly B is provided at a first end thereof with inner threads 601 which serve to be screwed with the outer threads P171 of an outer sleeve P17. Another end of the outer sleeve P17 is interiorly provided with inner threads P172 which to be screwed with a lower cover P18. In the lower cover P18 is disposed an annular groove P181 for reception of a wearing ring P19. The wearing ring P19 is slidably mounted on the outer periphery of the adjust ring P14. The above is the structural description of the shock absorber of the eleventh embodiment, and the structure of the unmarked components are same as the first embodiment, and therefore, further remarks would be omitted.

The outer sleeve P17 of the eleventh embodiment can cover the shock-absorbing spring 11 inside and prevent it from contamination. Moreover, the positioning key P13 makes the moveable ring P11 unrotatably slide on the outer periphery of the basement P12. However, the moveable ring P11 can be moved by the rotation of the adjust ring P14, and the moveable ring P11 can adjust the compressing force of the shock-absorbing spring 11.

Figure 40:
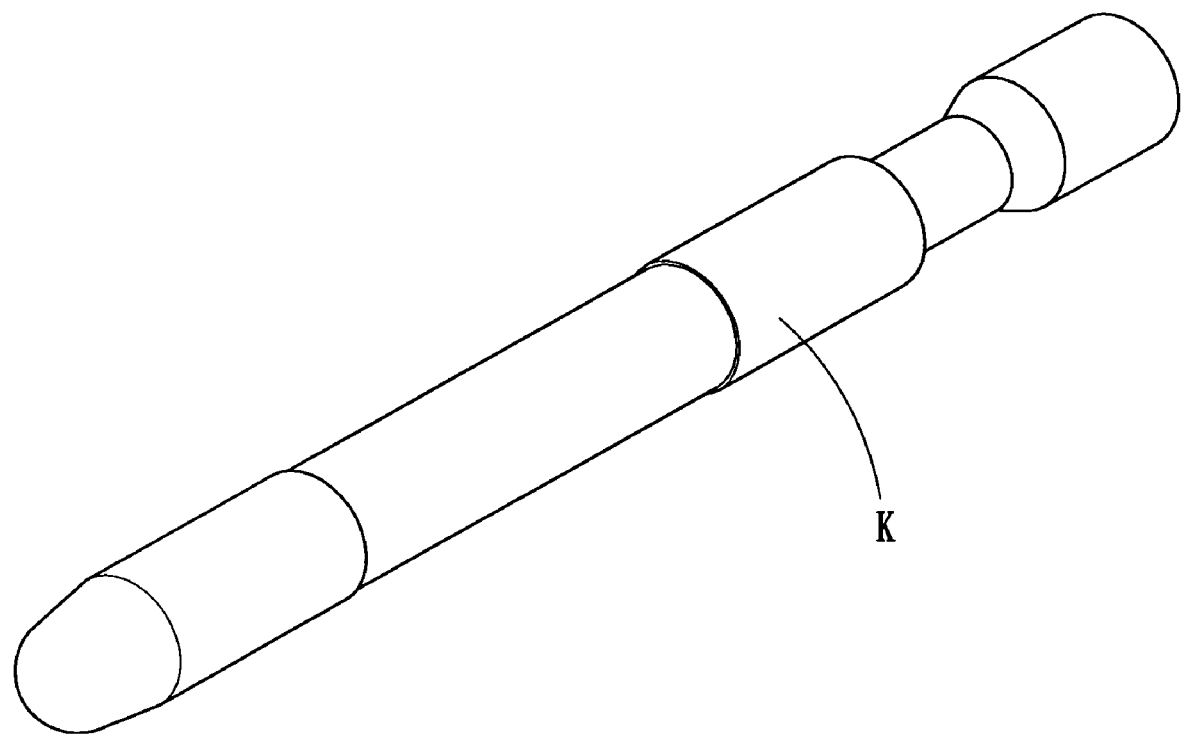
FIG. 40 is a partial exploded view of the shock absorber in accordance with a twelfth embodiment of the present invention.
Figure 41:
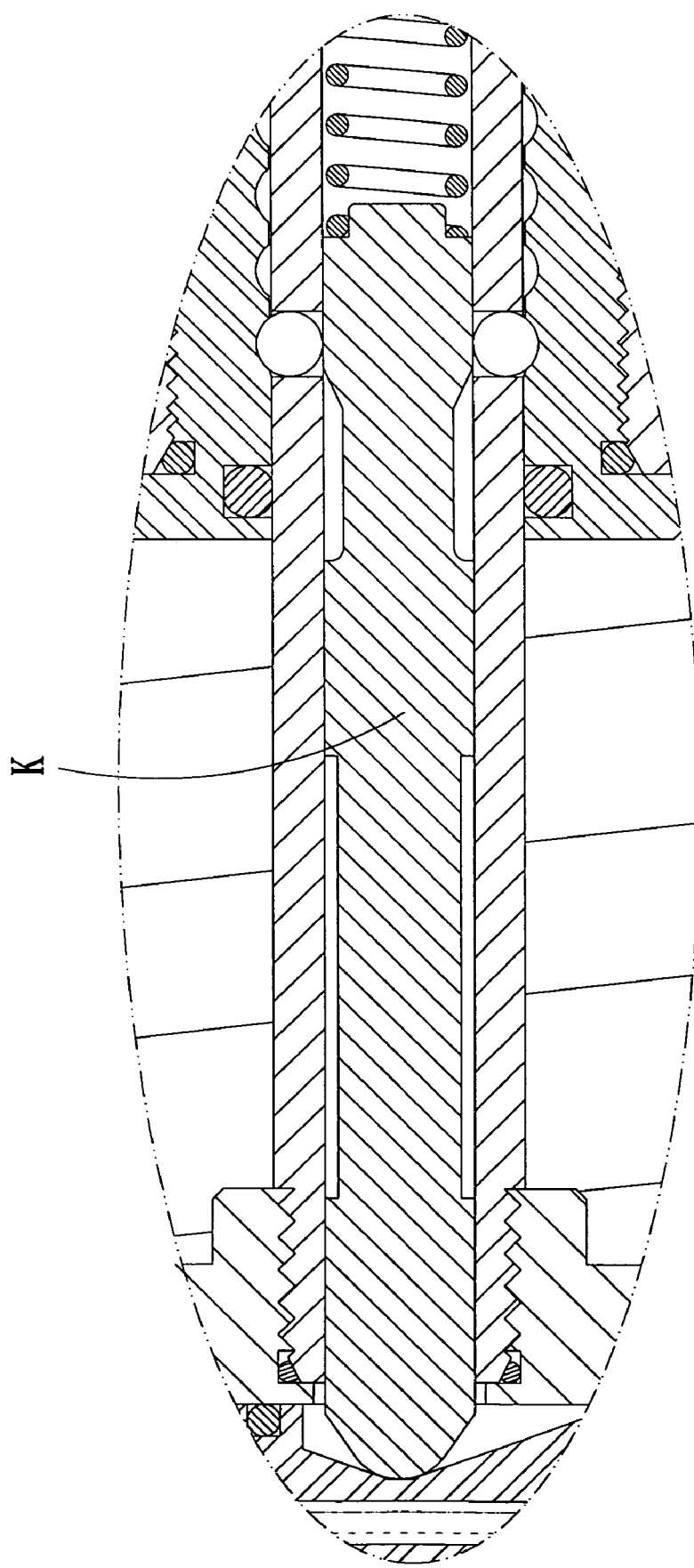
FIG. 41 is a cross sectional view in accordance with a twelfth embodiment of the present invention for showing the shock absorber.
Figure 42A:
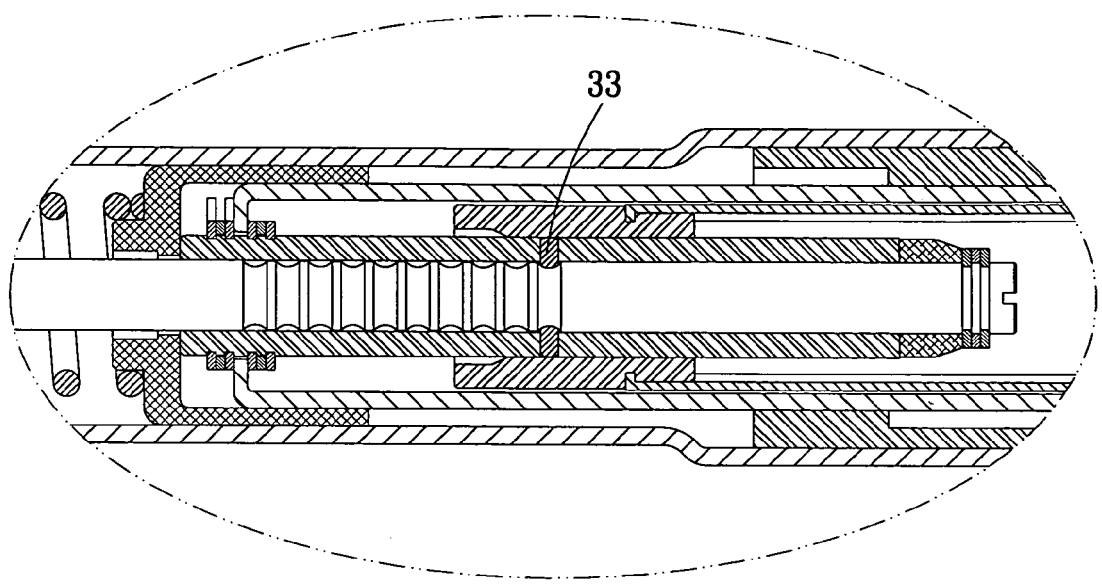
FIG. 42a is a cross sectional view of another type clutch member in accordance with the present invention.
Figure 42B:
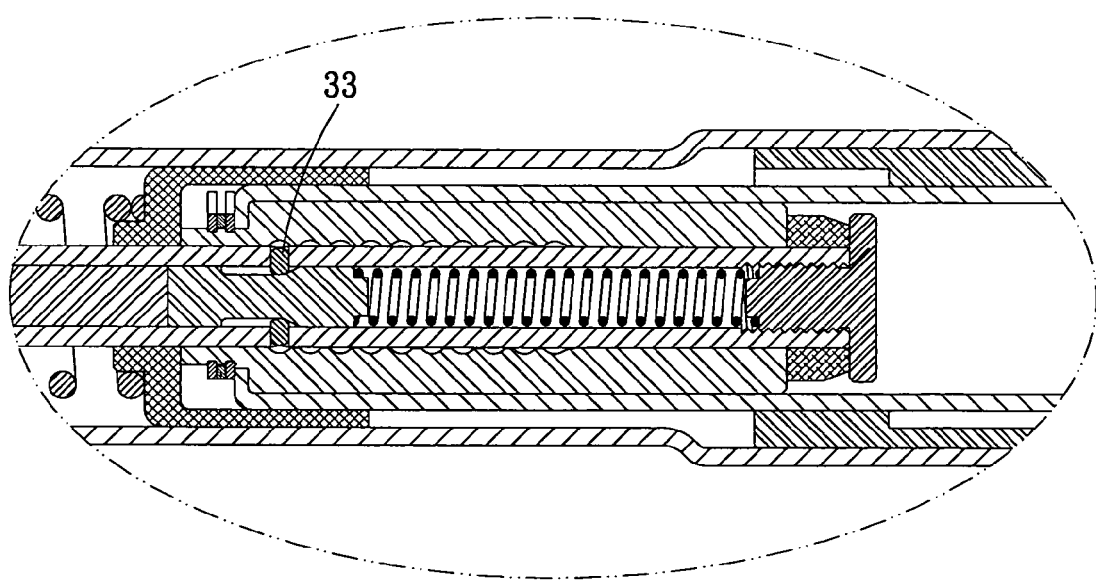
FIG. 42b is another cross sectional view of another type clutch member in accordance with the present invention.
Figure 42C:
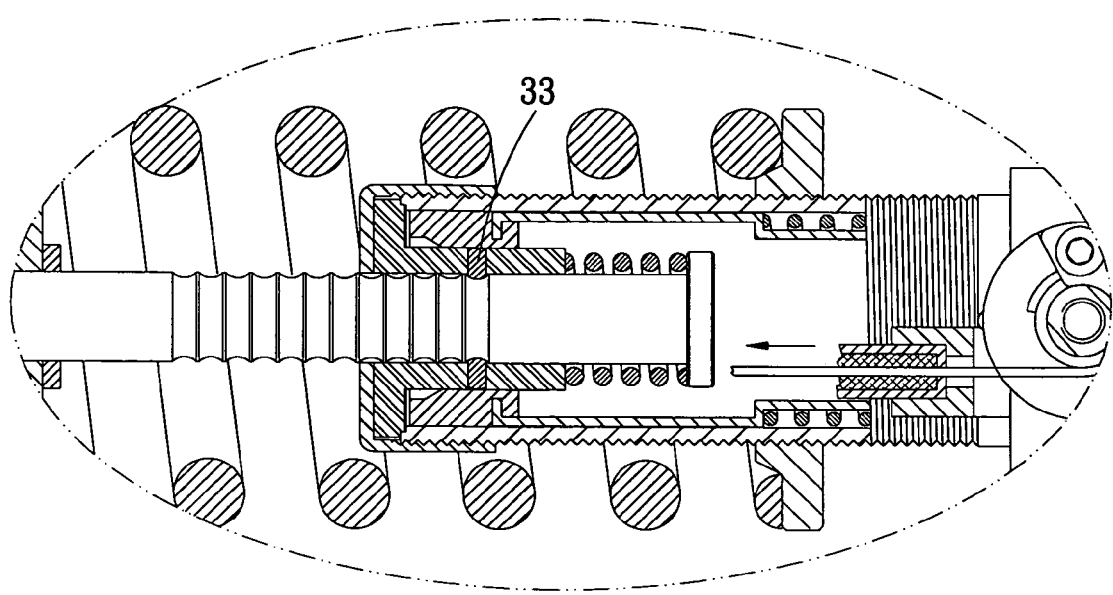
FIG. 42c is another cross sectional view of another type clutch member in accordance with the present invention.
Figure 42D:
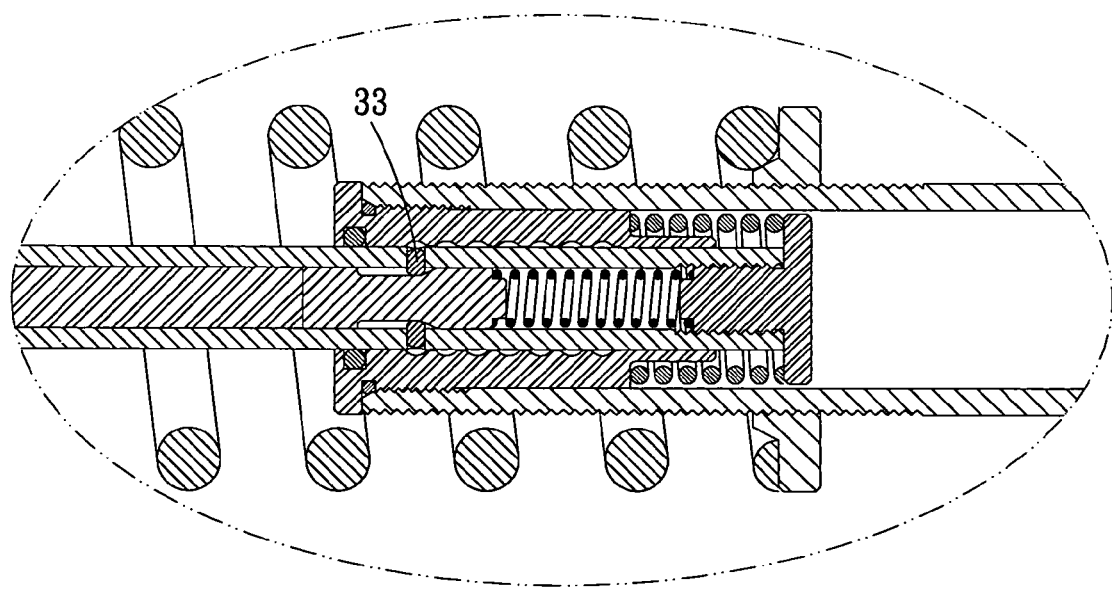
FIG. 42d is another cross sectional view of another type clutch member in accordance with the present invention.

Referring to FIGS. 40 and 41, which show a shock absorber in accordance with a twelfth embodiment of the present invention. The control member and the abutting member in the above-mentioned embodiments are used to perform abutting and pushing operation via other components, both of the control member and the abutting member can be integrally formed together under the condition that there is no problem of heat-treatment-caused deformation. Thereby, the control abutting member K is right the integral combination of the control member and the abutting member, which also can turn on/off the shock absorbing function of the shock absorber according to user's needs. The technical features in this embodiment are same as that of the other's embodiments and may be made without departing from the scope of the present invention.

As shown in FIGS. 42a–d, all the clutch members 33 in the above respective embodiments can be ball-shaped or cylinder-shaped.

Figure 43:
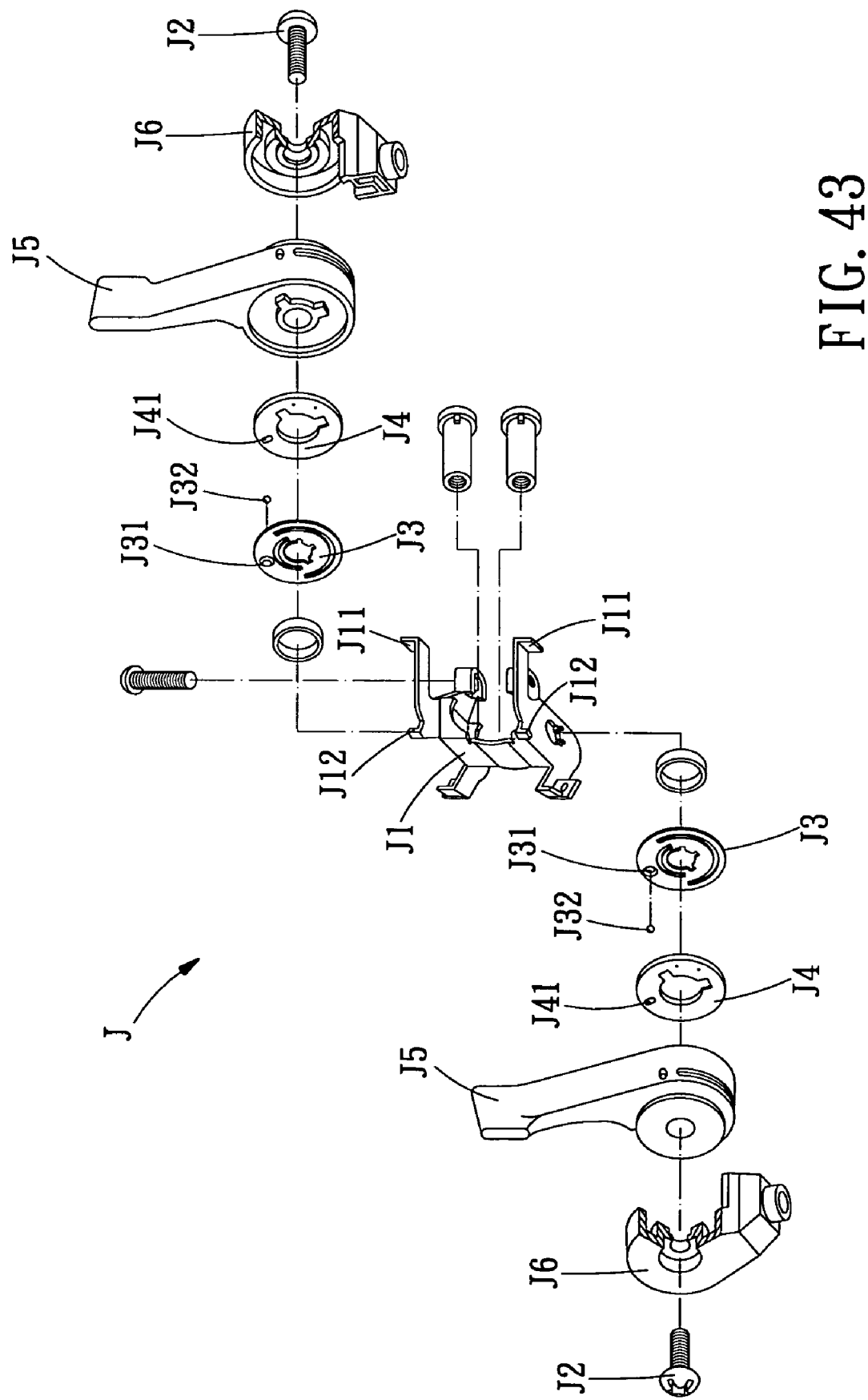
FIG. 43 is an exploded view of a cable-control handle in accordance with the present invention.
Figure 44:
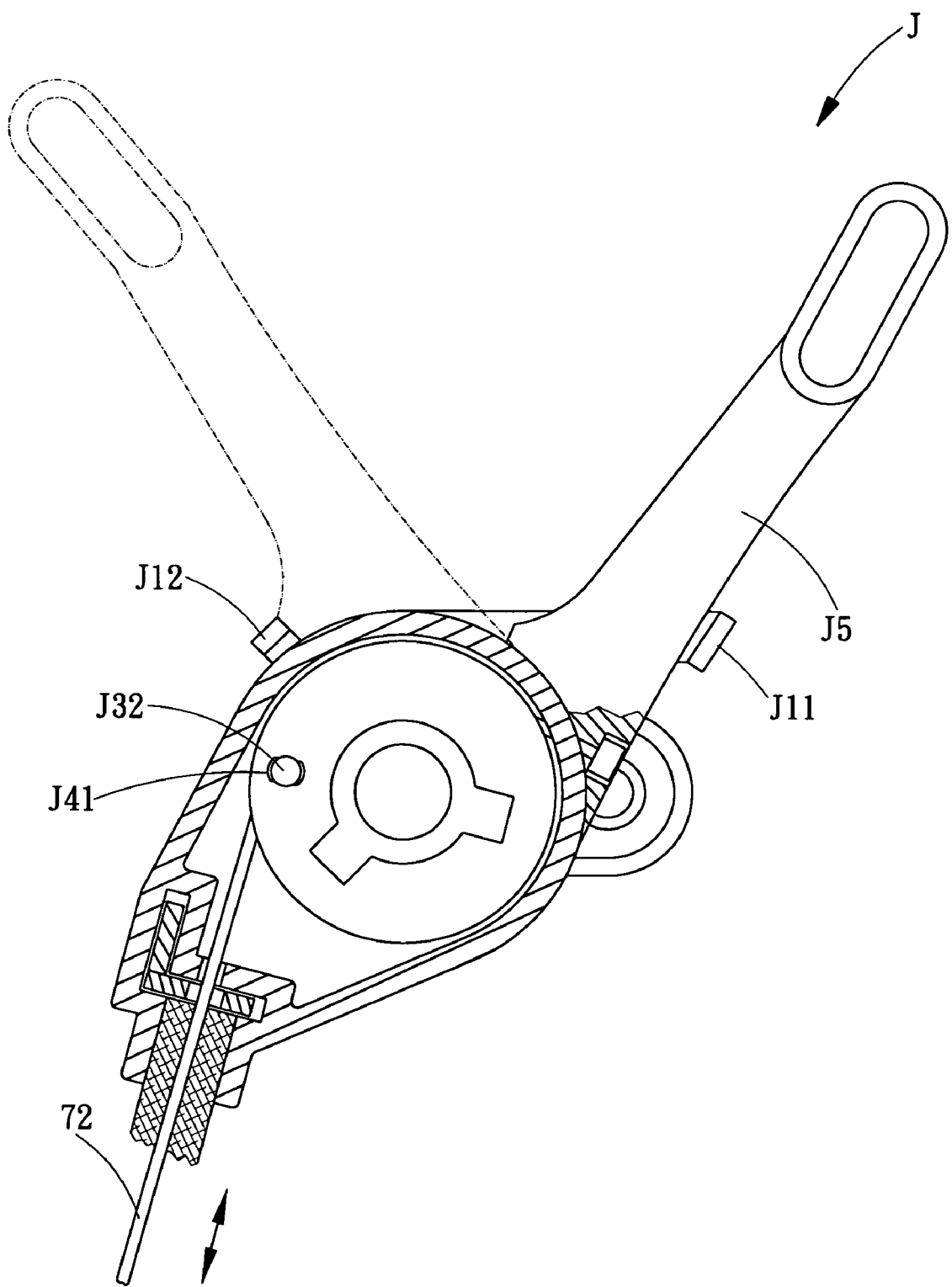
FIG. 44 is an operational view of the cable-control handle in accordance with the present invention.
Figure 45:
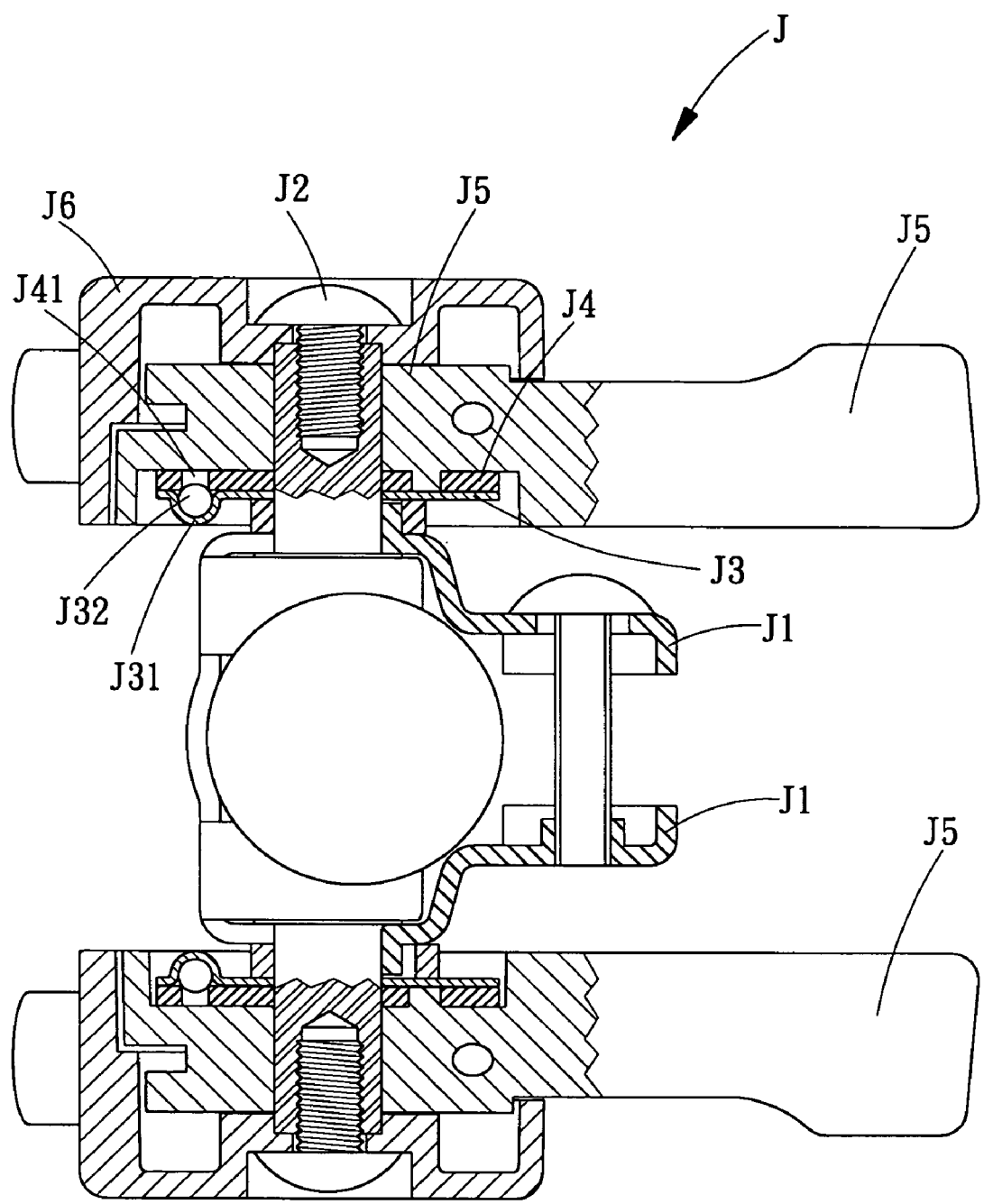
FIG. 45 is a cross sectional view of the cable-control handle in accordance with the present invention.

In addition, the operation manner of the steel cord 72 belongs to conventional skill. Here, FIGS. 43–45 particularly disclose a preferred steel-cord control handle J in accordance with the present invention. The control handle J is directly mounted on the handle bar of a bike, which includes an elastic plate J3, a positioning disc J4, a handle J5 and a cover J6 are disposed on a base body J1 by a screw J2. The elastic plate J3 engages in the base body J1, and a groove J31 is formed on the elastic plate J3 for reception of a steel ball J32. The positioning disc J4 is mounted on the handle J5, at a position on the positioning disc J4 corresponding to the steel ball J32 and the position for pulling the steel cord 72 is formed with a positioning hole J41. The elastic plate J3 elastically abuts against the steel ball J32 and confines it in the positioning hole J41, and synchronously positions the steel cord 72. The base body J1 is provided with a first protrusive portion J11 which is to be abutted by an end of the handle J5. A second protrusive portion J12 is provided on the base body J1, such that the handle can rest on the second protrusive portion J12 when pulling and releasing the steel cord 72.

By using the above-mentioned control handle J, the user is able to control the steel cord 72 on the handle bar. When pulling the steel cord 72 by rotating the handle J5 toward the first protrusive portion J11, the positioning hole J41 on the positioning disc J4 of the handle J5 will be engaged with the steel ball J32 in the groove J31 of the elastic plate J3. When the user rotates the handle J5 in an opposite direction, the handle J5 will release the steel cord 72 and makes it rest on the second protrusive portion J12 of the base body J1. Hence, the steel cord 72 can be controlled by the user to turn on/off the shock function of the shock absorber.

Referring to FIGS. 46a–f, in each of the positioning holes of the axial tube is received a positioning bush L1 (since the reference No of the axial tubes in the respective embodiments are different, here the axial tube is unmarked). An end of the respective positioning holes is formed with an inner flange L2 which enables the positioning bush L1 to be positioned in the positioning hole of the axial bush. An end of the positioning bush 11 abuts against the inner flange 12, while another of the positioning bush 11 is stopped by a concave deformation L3 which is formed on the peripheral side of the axial tube and located beside the locating hole of the axial tube, such that the positioning bush is positioned in the locating hole of the axial tube.

Figure 46A:
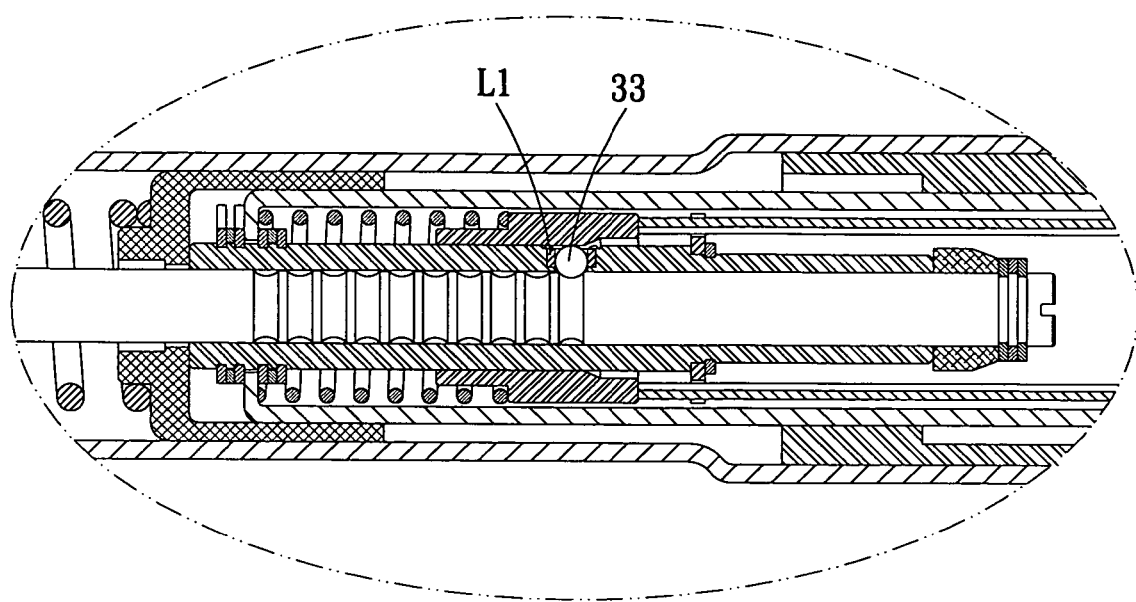
FIG. 46a is a structural cross sectional view in accordance with the present invention, which shows the positioning bush L1 is disposed in the positioning hole of the axial tube.
Figure 46B:
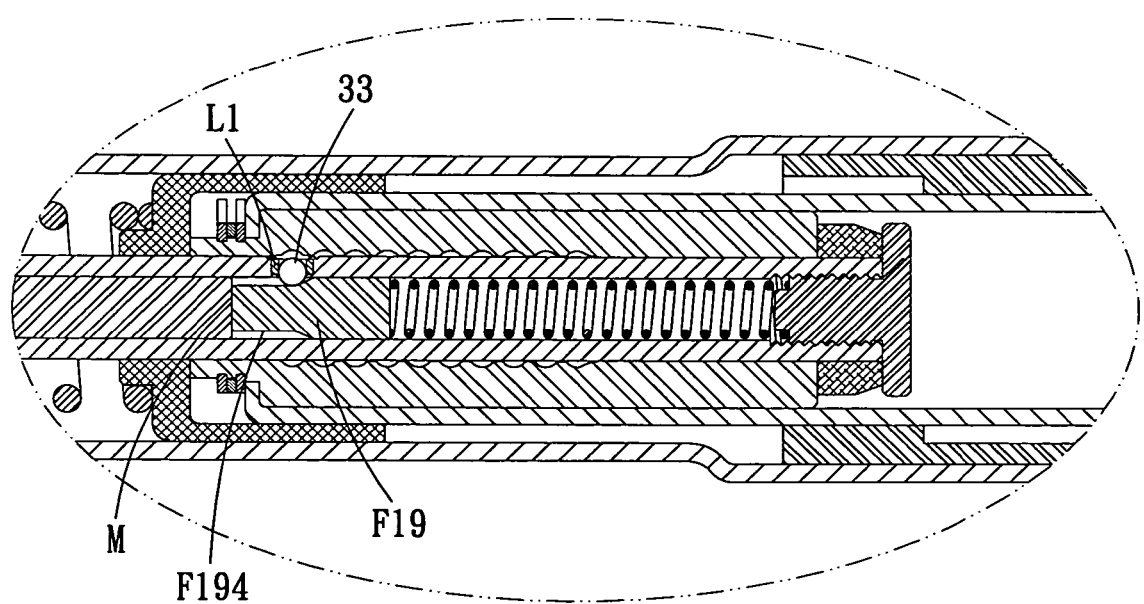
FIG. 46b is another structural cross sectional view in accordance with the present invention, which shows the positioning bush L1 is disposed in the positioning hole of the axial tube.
Figure 46C:
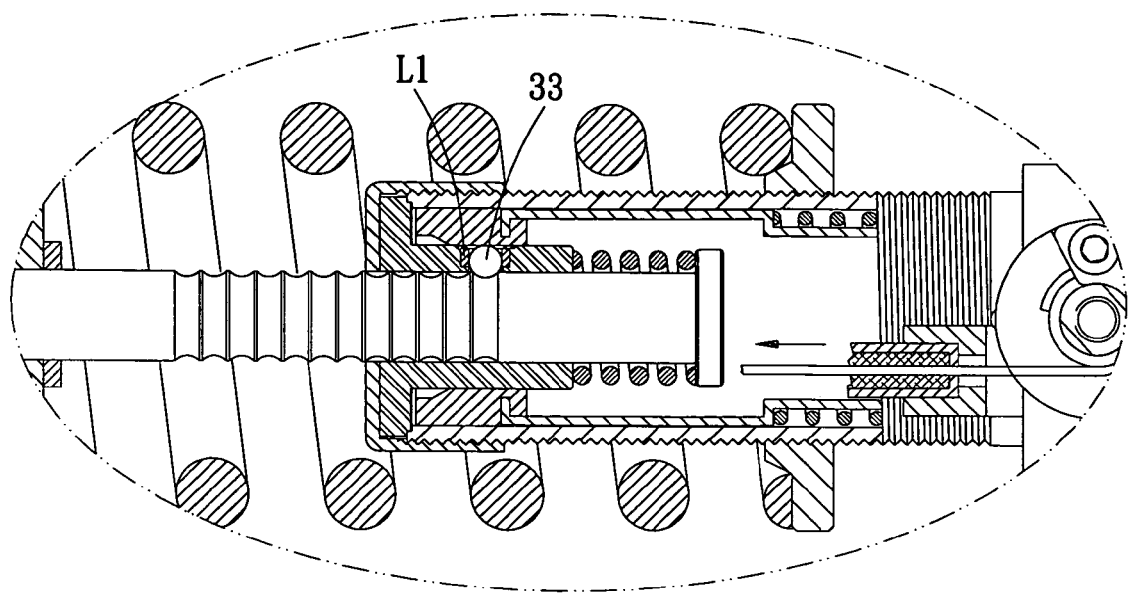
FIG. 46c is another structural cross sectional view in accordance with the present invention, which shows the positioning bush L1 is disposed in the positioning hole of the axial tube.
Figure 46D:
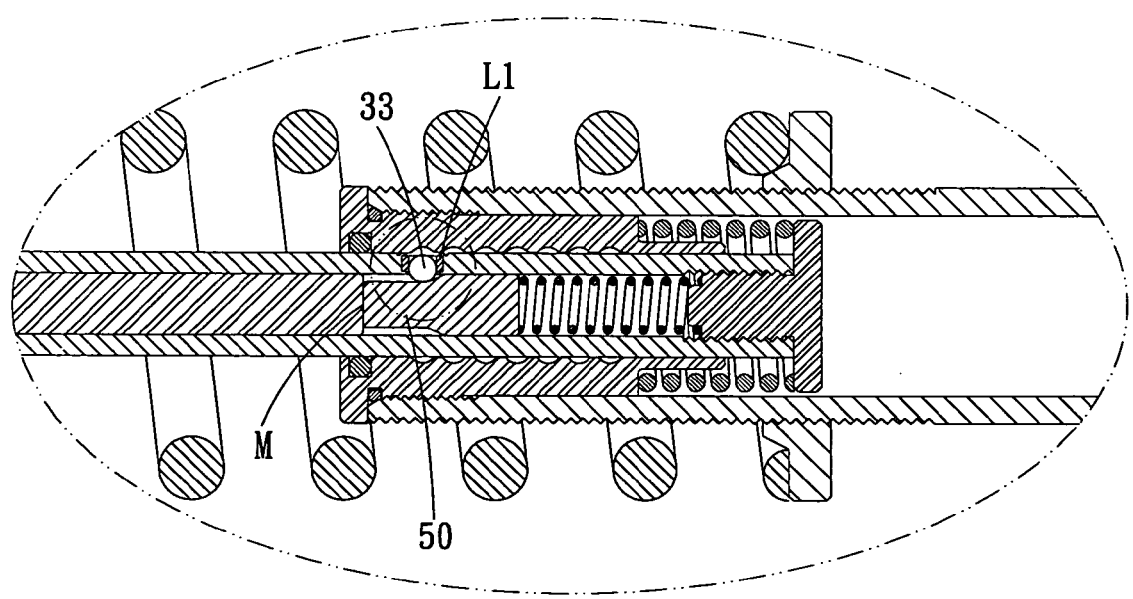
FIG. 46d is another structural cross sectional view in accordance with the present invention, which shows the positioning bush L1 is disposed in the positioning hole of the axial tube.
Figure 46E:
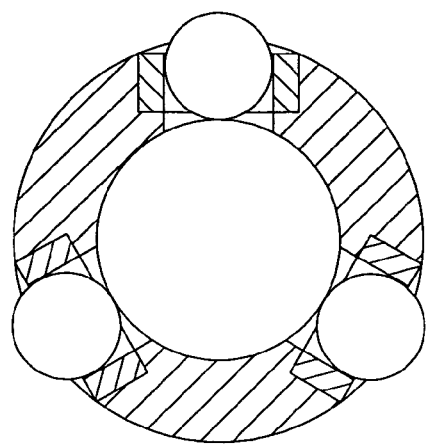
FIG. 46e is another structural cross sectional view in accordance with the present invention, which shows the positioning bush L1 is disposed in the positioning hole of the axial tube.
Figure 46F:
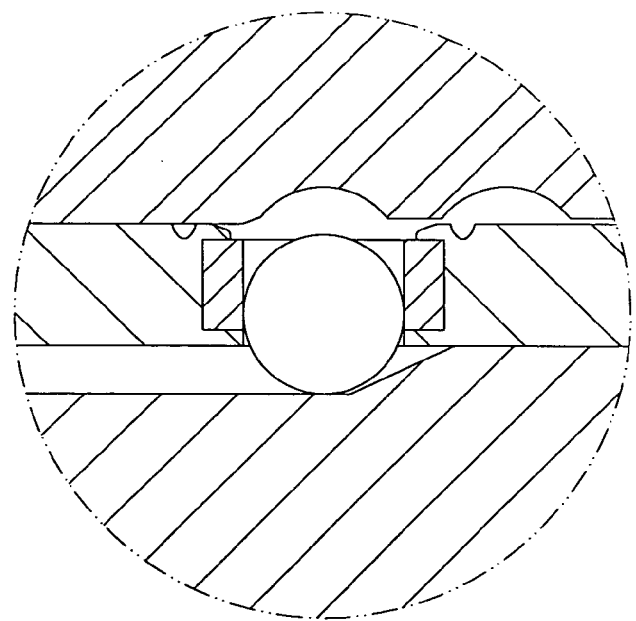
FIG. 46f is another structural cross sectional view in accordance with the present invention, which shows the positioning bush L1 is disposed in the positioning hole of the axial tube.

As shown in FIG. 46b, an end of the control element F19 of the clutch assembly is formed with a small diameter portion F194, and another end of the same is formed with a big diameter portion F193, an end surface M of the small diameter portion F194 abuts against an end of the abutting member of the control assembly.

While we have shown and described various embodiments in accordance with the present invention, it should be clear to those skilled in the art that further embodiments may be made without departing from the scope of the present invention.

What is claimed is:

1. A shock absorber comprising a basement, a clutch assembly, a control assembly and a shock-absorbing spring, the shock-absorbing spring providing damper elastic force for the respective components of the shock absorber, wherein:

the clutch assembly comprises a positioning member, an axial tube, a clutch member and a control element, the positioning member is formed with plural positioning grooves, the axial tube is formed with plural positioning holes, the positioning member and the axial tube are telescopically disposed, the clutch member is received in the positioning holes of the axial tube, the control element is able to operate under control and serves to move the clutch member, the control element is formed with annular cone-shaped step portion that divides the control element into a big diameter portion and a small diameter portion, the big diameter portion and the small diameter portion serve to push the clutch member to move, with cooperation between the clutch member and the positioning member, the control element is able to control motion of the clutch assembly, through this way, the shock-absorbing function of the shock absorber can be turned on/off; and the control assembly includes a base body, a control shaft, a control spring, a back-moving spring, a abutting member and a rotary knob, the base body is formed with a control hole for reception of the control shaft, the control shaft is able to rotate after being pulled by a steel cord, the control shaft is formed with an eccentric abutting portion which is used to abut against a first end of the abutting member, a second end of the abutting member serves to abut against the control element of the clutch assembly, the eccentric abutting portion will rotate during rotation of the control shaft and synchronously will move the abutting member and the control element of the clutch assembly, at the moment, the rotation of the control shaft causes compression of the control spring and the back-moving spring, the back-moving spring pushes the control shaft to its original position with the compressed elastic force, the control spring abuts against the control element with one end and moves the control element with its compressed elastic force.

2. The shock absorber as claimed in claim 1, wherein:
the basement, a first end of which is fixed to a body of a bike and a second end of which is formed with a mouth in communication with a space inside the basement;
the shock-absorbing spring is mounted on exterior of the basement and biased between the control assembly and the basement.

\* \* \* \* \*